US012378636B2

(12) United States Patent
Hidalgo Betanzos et al.

(10) Patent No.: US 12,378,636 B2
(45) Date of Patent: Aug. 5, 2025

(54) PROCESS FOR RECOVERING COBALT ION, NICKEL ION AND MANGANESE ION FROM METAL-CONTAINING RESIDUES

(71) Applicant: FUNDACION TECNALIA RESEARCH & INNOVATION, Donostia-San Sebastián (ES)

(72) Inventors: Joaquin Hidalgo Betanzos, Donostia-San Sebastián (ES); Lourdes Yurramendi Sarasola, Donostia-San Sebastián (ES); Amal Inoka Siriwardana, Donostia-San Sebastián (ES); Carmen Del Río Gaztelurrutia, Donostia-San Sebastián (ES)

(73) Assignee: FUNDACION TECNALIA RESEARCH & INNOVATION, Donostia-San Sebastián (ES)

( * ) Notice: Subject to any disclaimer, the term of this patent is extended or adjusted under 35 U.S.C. 154(b) by 415 days.

(21) Appl. No.: 18/017,828

(22) PCT Filed: Aug. 2, 2021

(86) PCT No.: PCT/EP2021/071574
§ 371 (c)(1),
(2) Date: Jan. 24, 2023

(87) PCT Pub. No.: WO2022/029081
PCT Pub. Date: Feb. 10, 2022

(65) Prior Publication Data
US 2023/0304126 A1 Sep. 28, 2023

(30) Foreign Application Priority Data
Aug. 3, 2020 (EP) .................................... 20382720

(51) Int. Cl.
*C22B 7/00* (2006.01)
*C22B 3/00* (2006.01)
*C22B 47/00* (2006.01)

(52) U.S. Cl.
CPC .......... *C22B 23/0415* (2013.01); *C22B 7/007* (2013.01); *C22B 23/0453* (2013.01); *C22B 47/0063* (2013.01); *C22B 47/009* (2013.01)

(58) Field of Classification Search
CPC . C22B 23/0415; C22B 7/007; C22B 23/0453; C22B 47/0063; C22B 47/009; C22B 3/44; Y02W 30/84
See application file for complete search history.

(56) References Cited

FOREIGN PATENT DOCUMENTS

KR 2012-0128913 A 11/2012

OTHER PUBLICATIONS

International Search Report and Written Opinion mailed Oct. 12, 2021 for International Application No. PCT/EP2021/071574, 16 pages.
Duan et al., "Recycling and Direct-Regeneration of Cathode Materials from Spent Ternary Lithium-Ion Batteries by Hydrometallurgy: Status Quo and Developing", Johnson Matthey Technology Review, 2020.
Gao et al., "Lithium Carbonate Recovery from Cathode Scrap of Spent Lithium-Ion Battery: A Closed-Loop Process," Environ. Sci. Technol., vol. 51(3), 2017, pp. 1662-1669.
Li et al., "Sustainable Recovery of Cathode Materials from Spent Lithium-Ion Batteries Using Lactic Acid Leaching System", ACS Sustainable Chem. Eng., vol. 5(6), 2017, pp. 5224-5233.
Roshanfar et al., "An environmentally friendly method for recovery of lithium and cobalt from spent lithium-ion batteries using gluconic and lactic acids", J. Environ. Chem. Eng., vol. 7(1), 2018, p. 102794.

*Primary Examiner* — Jessee R Roe
(74) *Attorney, Agent, or Firm* — Squire Patton Boggs (US) LLP

(57) ABSTRACT

The present invention relates to a process for recovering one or more metal ions selected from the group consisting of Cobalt, Nickel, Manganese and a mixture thereof from metal-containing residues comprising: A) leaching the residue with a leaching solution comprising lactic acid to obtain a filtrate 1 and a solid cake 1; B) separating the filtrate 1; C) precipitating the Cobalt lactate, Nickel lactate or Manganese lactate from the filtrate 1 to obtain a filtrate 2 and a precipitate 1; and D) separating the precipitate 1; or alternatively, A) leaching the residue with the leaching solution to obtain a filtrate 1 and a solid cake 1; E) precipitating the Cobalt lactate, Nickel lactate or Manganese lactate from the filtrate 1 to obtain a filtrate 3 and a solid cake 2; and F) separating the solid cake 2; and G) separating the Cobalt lactate, Nickel lactate or Manganese lactate from the solid cake 2.

16 Claims, 2 Drawing Sheets

PROCESS FOR RECOVERING COBALT ION, NICKEL ION AND MANGANESE ION FROM METAL-CONTAINING RESIDUES

CROSS-REFERENCE

This application is a National Stage filing under 35 U.S.C. § 371 of International Patent Application No. PCT/EP2021/071574, filed Aug. 2, 2021, which claims the benefit of and priority to European Patent Application No. 20382720.9 filed Aug. 3, 2020, the contents of all of which are hereby incorporated by reference in their entireties for all purposes.

The present invention relates to process for recovering Cobalt ion, Nickel ion and Manganese ion from metal-containing residues; particularly from batteries. In particular, to a process for recovering Cobalt ion, Nickel ion and Manganese ion from residues which comprising the use of lactic acid as leaching and precipitating agent.

BACKGROUND ART

The disposal of metal-containing residues has hitherto been predominantly by deposition in a landfill, incineration or thermometallurgical processes with considerable pollution of the environment and only low recovery of the metallic materials. The most common metal-containing residue is that which comes from metal industrial activity such as alloys and metal catalyst; or from dispensable electronic devices such as laptop and mobile phone batteries.

In particular, batteries are essential for the energy storage in the electronics used in our everyday lives, from small portable electronic devices (PEDs) like cell phones and laptops to medical devices or electric vehicles (EV).

Batteries include a great variety of materials including valuable metals (Li, Co, Ni, Mn, Cu, Al . . . ), graphite, and organic compounds. A battery cell functions by the reversible transportation of ions and electrons between the anode and cathode separated by a porous membrane generally made of plastics and filled with organic electrolyte containing additive salts. The anode and cathode are constructed by powder of active electrode materials (e.g., Cobalt, Nickel, manganese, and iron) attached on current collector foils (of cooper and aluminium).

The three most popular batteries are Nickel Cadmium batteries, Nickel metal hydride batteries and Lithium Ion batteries. However, lithium-ion type is the main battery technology adopted by the PED and EV industry, which accounts for most of the growth of global battery demand in the near-future. These Lithium Ion batteries include apart from lithium some other raw materials such as Cobalt, Nickel, Manganese, Aluminium and Iron.

Future waste forecasts estimate 4 million tons of cumulative end of life (EOL) EV battery modules by 2030, which is above current global recycling capacity. Therefore, legislation in Europe has defined that all the spent batteries collected must undergo treatment and recycling. However, despite their continued extensive implementation, methods to recycle and reuse end-of-life (EOL) battery materials are still under development.

Processes for recycling batteries commonly used can be divided into three different types: mechanical, pyrometallurgical and hydrometallurgical processes. Currently, at commercial industrial scale a combination of them are used for recovering metal raw materials of batteries.

Recycling methods usually involve several steps. In the first initial stage, after collection and selection of the batteries, the cells are discharged (immersion in salt solutions) and mechanically treated (i.e. shredded or crushed, sieved, air, water bath or magnetically separated). When breaking the structure of batteries, a mixture of casing (steel), current collectors (Cu, Al), plastic separators, electrolyte and active mass (AM) (i.e. $LiCoO_2$) is obtained. After this stage the material is converted in a black milled powder called black mass (BM). The second stage can be a pyrometallurgical treatment. In the actual industrial recycling processes, those treatments are the traditional ones which involves three different steps: pyrolysis, reduction and incineration. Finally, in the last stage, a hydrometallurgical treatment is applied. Usually, this step involves leaching the BM obtained in the last step to transform by chemical reactions the substances present in the BM into new compounds. The most commonly used leaching solutions contains inorganic acids such as sulfuric acid, chlorhidric acid and nitric acid. Finally, a final precipitation can be performed to recover the original compounds of interest by the addition of precipitating agents.

However, the above-mentioned recycling processes have several drawbacks. In particular, they have a great negative impact in the environment because of the use of extreme experimental conditions and also harmful and polluting reagents. Furthermore, these processes are not capable of recycling efficiently all metal substances present in spent batteries such as lithium, Cobalt, Nickel, manganese, and iron; and particularly Nickel and Cobalt.

Therefore, from what is known in the art, it is derived that there is still the need of providing an environmentally friendly, easy industrial scalable, more efficient, safety, and selective process for recycling metal-containing residues (for instance spent batteries) and particularly for recovering Cobalt ion, Nickel ion and Manganese from metal-containing residues.

SUMMARY OF INVENTION

The inventors have provided an efficient process for the selective recovery of the metal ions Cobalt, Nickel and Manganese from metal-containing residues, such as batteries. In particular, the inventors have found that the use of lactic acid as leaching agent and also as precipitating agent allows increasing the recovery efficiency of Cobalt, Nickel and Manganese from metal-containing residues without compromising its selectivity in relation to the remaining metal components of the residue. In particular, the process of the invention allows having a extraction yield of Cobalt higher than 80%, of Nickel higher than 70%; and of Manganese higher than 85% in a first extraction pass.

The process of the invention in comparison with the processes of the state of the art can be performed with a high ratio between the metal solid residues such as spent batteries and the liquid of the leaching solution in the reaction mixture maintaining a high recovery yield and a high selectivity.

Besides, the process is versatile because a huge range of metal residues, particularly spent batteries residues, can be used as starting material. In particular, the process of the invention allows an efficient and selective Cobalt, Nickel and Manganese recovery from metal residues (i.e. spent batteries residues) which have not been submitted to complexes pyrometallurgical pre-treatments as those disclosed in the state of the art.

The inventors have also found that the process also implies the use of simple separating steps such as filtration step under mild conditions or even the use of non organic solvents for the Cobalt, Nickel and Manganese recovery from the solid cakes; which allows the reuse of filtrates obtained in the process having a low amount of Cobalt, Nickel and Manganese as leaching solution.

And, further, the process of the invention is also advantageous because it is performed in the absence of harmful reagents and under mild reaction which means that it is environmentally friendly and ensures the safety and health of employees, which is also advantageous because is easier for its industrial scale-up.

The aspect of the invention relates to a process for recovering one or more metal ions selected from the group consisting of Cobalt, Nickel, Manganese and a mixture thereof from metal-containing residues comprising: A) leaching the residue with a leaching solution comprising lactic acid to obtain a leaching mixture formed by a filtrate 1 comprising the Cobalt lactate, the Nickel lactate, the Manganese lactate or a mixture thereof and a solid cake 1; B) separating the filtrate 1 from the leaching mixture obtained in step A); C) precipitating the Cobalt lactate, Nickel lactate, Manganese lactate or a mixture thereof from the filtrate 1 obtained in step B) to obtain a precipitating mixture formed by a filtrate 2 and a precipitate 1 comprising the Cobalt lactate, the Nickel lactate, the Manganese lactate or a mixture thereof; and D) separating the precipitate 1 comprising the Cobalt lactate, the Nickel lactate, the Manganese lactate or a mixture thereof from the precipitating mixture obtained in step C); or alternatively, A) leaching the residue with a leaching solution comprising lactic acid to obtain a leaching mixture formed by a filtrate 1 comprising the Cobalt lactate, the Nickel lactate, the Manganese lactate or a mixture thereof and a solid cake 1; E) precipitating the Cobalt lactate, the Nickel lactate, the Manganese lactate or a mixture thereof from the filtrate 1 obtained in step A) to obtain a precipitating mixture formed by a filtrate 3 and a solid cake 2 comprising the Cobalt lactate, the Nickel lactate, the Manganese lactate or a mixture thereof; and F) separating the solid cake 2 from the precipitating mixture obtained in step E); and G) separating the Cobalt lactate, the Nickel lactate, the Manganese lactate or a mixture thereof from the solid cake 2.

DETAILED DESCRIPTION OF THE INVENTION

Figure 1:
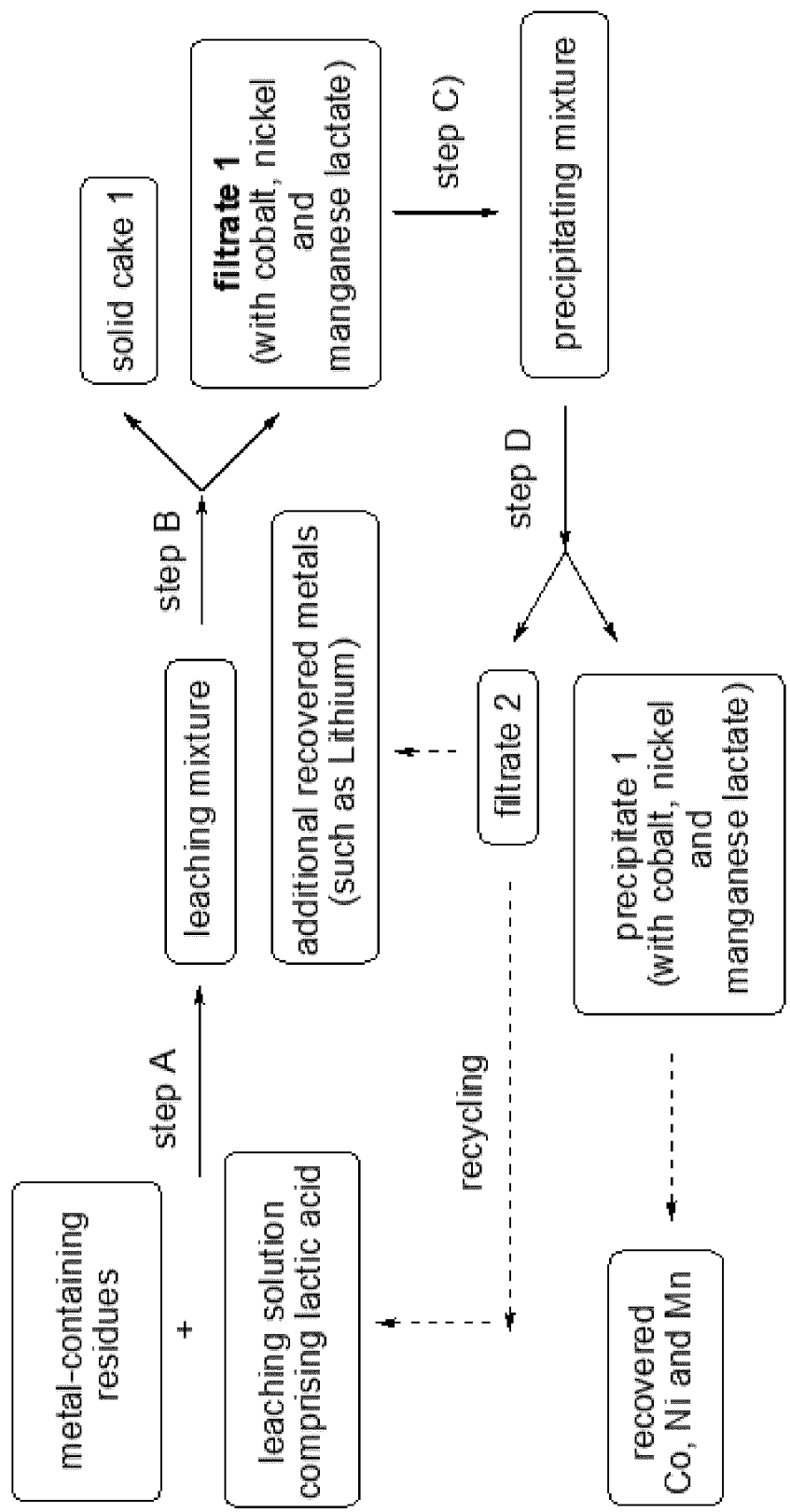
FIG. 1 shows a flowchart of the first alternative process for recovering Cobalt ion, Nickel ion and Manganese ion from metal-containing residues of the present invention.
Figure 2:
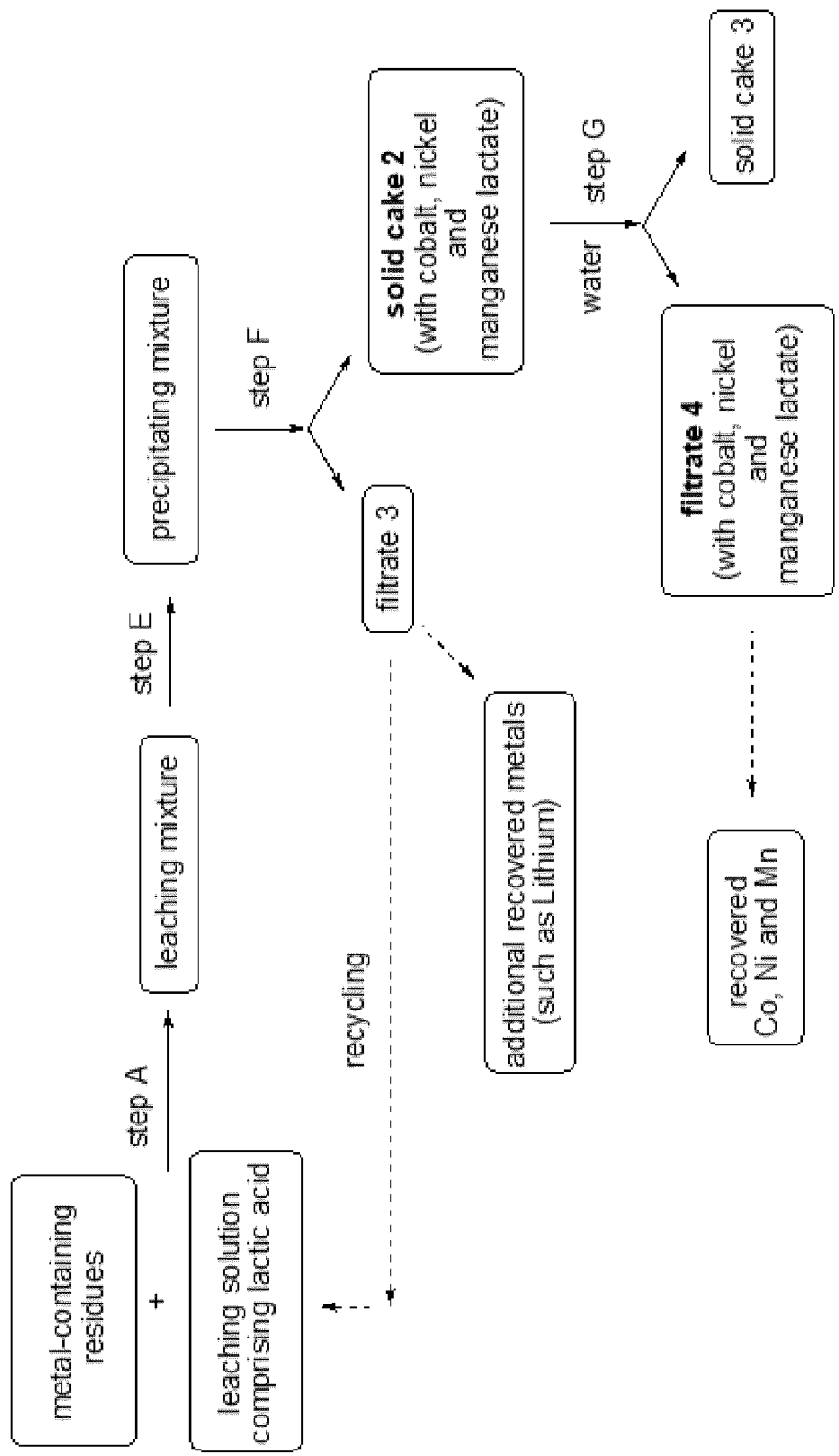
FIG. 2 shows a flowchart of the second alternative process for recovering Cobalt ion, Nickel ion and Manganese ion from metal-containing residues of the present invention.

All terms as used herein in this application, unless otherwise stated, shall be understood in their ordinary meaning as known in the art. Other more specific definitions for certain terms as used in the present application are as set forth below and are intended to apply uniformly throughout the specification and claims unless an otherwise expressly set out definition provides a broader definition.

For the purposes of the present invention, any ranges given include both the lower and the upper end-points of the range. Ranges and values given, such as temperatures, times, and the like, should be considered approximate, unless specifically stated.

The terms "percentage (%) by weight", "weight/weight %" and "w/w %" have the same meaning and are used interchangeable. They refer to the weight of a component in relation to the total weight of a mixture/composition. For example, the amount of lactic acid in the leaching solution is 40% by weight in relation to the total weight of the leaching solution.

The term "weight ratio" refers to the relation in weight of a given compound to another given compound, for instance, between the weight of solids and the weight of liquid phase of the leaching solution.

As it is mentioned above, the process of the invention for recovering one or more metal ions selected from the group consisting of Cobalt, Nickel, Manganese and a mixture thereof from metal-containing residues comprises:
  A) leaching the residue with a leaching solution comprising lactic acid to obtain a leaching mixture formed by a filtrate 1 comprising Cobalt lactate, the Nickel lactate, the Manganese lactate or a mixture thereof and a solid cake 1;
  B) separating the filtrate 1 from the leaching mixture obtained in step A);
  C) precipitating the Cobalt lactate, the Nickel lactate, the Manganese lactate or a mixture thereof from the filtrate 1 obtained in step B) to obtain a precipitating mixture formed by a filtrate 2 and a precipitate 1 comprising Cobalt lactate, the Nickel lactate, the Manganese lactate or a mixture thereof; and
  D) separating the precipitate 1 comprising the Cobalt lactate, the Nickel lactate, the Manganese lactate or a mixture thereof from the precipitating mixture obtained in step C).

In an alternative, the process of the invention for recovering one or more metal ions selected from the group consisting of Cobalt, Nickel, Manganese and a mixture thereof from metal-containing residues comprises:
  A) leaching the residue with a leaching solution comprising lactic acid to obtain a leaching mixture formed by a filtrate 1 comprising the Cobalt lactate, the Nickel lactate, the Manganese lactate or a mixture thereof and a solid cake 1;
  E) precipitating the Cobalt lactate, the Nickel lactate, the Manganese lactate or a mixture thereof from the filtrate 1 obtained in step A) to obtain a precipitating mixture formed by a filtrate 3 and a solid cake 2 comprising the Cobalt lactate, the Nickel lactate, the Manganese lactate or a mixture thereof; and
  F) separating the solid cake 2 from the precipitating mixture obtained in step E); and
  G) separating the Cobalt lactate, the Nickel lactate, the Manganese lactate or a mixture thereof from the solid cake 2.

For the purpose of the invention, the terms "residue", "metal residue", "metal containing residue" have the same meaning and are used interchangeable. They refer to a residue that contains one or more metals or metal oxides. In an embodiment, the process of the invention for recovering one or more metal ions selected from the group consisting of Cobalt, Nickel, Manganese and a mixture thereof from metal-containing residues, is one wherein the metal residue is selected from the group consisting of spent battery, metal alloy and metal catalyst.

In an embodiment, the process of the invention for recovering one or more metal ions selected from the group consisting of Cobalt, Nickel, Manganese and a mixture thereof from metal-containing residues comprises, is one wherein the residue is a spent battery. In an embodiment, the process of the invention for recovering one or more metal ions selected from the group consisting of Cobalt, Nickel, Manganese and a mixture thereof from metal-containing residues comprises, is one wherein the residue is a metal alloy. In an embodiment, the process of the invention for recovering one or more metal ions selected from the group consisting of Cobalt, Nickel, Manganese and a mixture thereof from metal-containing residues comprises, is one wherein the residue is a metal catalyst. For the purpose of the present invention, all the aspects and embodiments (taken them alone or in combination with other embodiments disclosed above or below) disclosed in the invention with any one of the types of residues taken separately forms also part of the invention.

In an embodiment, the process of the invention for recovering one or more metal ions selected from the group consisting of Cobalt, Nickel, Manganese and a mixture thereof from metal-containing residues comprises, is one wherein metal residue is selected from a residue comprising Cobalt, a residue comprising Nickel, a residue comprising Manganese, a residue comprising Cobalt and Nickel, a residue comprising Cobalt and Manganese, a residue comprising Nickel and Manganese and a residue comprising Cobalt, Nickel and Manganese. In an embodiment, the process of the invention for recovering one or more metal ions selected from the group consisting of Cobalt, Nickel, Manganese and a mixture thereof from metal-containing residues comprises, is one wherein metal residue is selected from a residue comprising a residue comprising a residue comprising Cobalt, Nickel and Manganese.

In an embodiment, the process of the invention is one for recovering Cobalt. In an embodiment, the process of the invention is one for recovering Nickel. In an embodiment, the process of the invention is one for recovering Manganese. In an embodiment, the process of the invention is one for recovering Cobalt and Nickel. In an embodiment, the process of the invention is one for recovering Cobalt and Manganese. In an embodiment, the process of the invention is one for recovering Nickel and Manganese. In an embodiment, the process of the invention is one for recovering Cobalt, Nickel and Manganese.

The metal content of the residue conditioned the metal being recovered. For example, if the metal residue contains Cobalt and Nickel, the process of the invention is one for recovering Cobalt ion, Nickel ion and a mixture thereof.

As it is disclosed above, step A) of the process of the present invention comprises leaching the metal residue, particularly spent battery, with a leaching solution comprising lactic acid to obtain a leaching mixture formed by a filtrate 1 comprising the Cobalt lactate, the Nickel lactate, the Manganese lactate or a mixture thereof and a solid cake 1 comprising the unreacted metal residue, particularly spent battery residues.

As it is disclosed above, in an embodiment the metal residue is a spent battery. For the purpose of the invention the terms "spent battery" or "battery" have the same meaning and are used interchangeable. They refer to primary batteries used as a power supply for electronic devices or instruments. Examples of electronic devices or instruments include small portable electronic devices (PEDs) for instance cell phones and laptops; medical devices; or electric vehicles (EV).

The spent battery can be in several forms. The spent batteries are commonly discharged by immersion in salt solutions, mechanically disintegrated and, optionally, they are submitted to additional treatments such as thermal treatment. In an embodiment, the spent battery is one being discharged and submitted at least to a mechanical disintegrating process. Typically, the mechanical disintegrating processes involve a dismantling and grinding step, followed by a sieving step that allows removing the casing (steel) and part of current collectors, reducing the cost of the process.

For the purpose of the invention, the spent batteries to be used as starting material are Cobalt, Nickel, Manganese or mixture thereof containing spent batteries; or alternatively of a mixture of Cobalt, Nickel, Manganese or mixture thereof containing spent batteries and non Cobalt, Nickel and Manganese containing spent batteries.

In an embodiment, the spent battery is a Cobalt, Nickel, Manganese or a mixture thereof containing spent batteries selected from the group consisting of Lithium-ion batteries and Nickel-metal hydride batteries, particularly discharged and submitted at least to a mechanical disintegrating process.

In an embodiment, the residue is one or more spent batteries in form of black mass. In the field of batteries, the term "black mass" refers to a powder comprising electrode materials including electrode active materials, polymeric binder, residual aluminum and copper current collection material, and other residual particulates. The chemical composition of black mass depends upon the chemistry of the scrap electrochemical cells, but for the purpose of the invention regardless the origin of the batteries, the black mass comprises at least Cobalt, Nickel, Manganese or a mixture thereof. Materials that are usually forming part of the black mass are selected from the group consisting of lithium metal oxides and lithium iron phosphate (cathode) and graphite (anode) as well as materials such as alkyl carbonates (e.g. $C_i$-$C_6$ alkyl carbonates, such as ethylene carbonate (EC), ethyl methyl carbonate (EMC), dimethyl carbonate (DMC), diethyl carbonate (DEC), propylene carbonate (PC), and mixtures thereof), iron, aluminum, copper, plastics, graphite, Cobalt, Nickel, aluminum, manganese, and of course lithium. The black mass is commonly obtained by mechanical or thermomechanical processes.

As it is disclosed above, in an embodiment the metal-residue is a metal alloy. For the purpose of the invention, the terms "metal alloy" or "alloy" have the same meaning and are used interchangeable. They encompasses both solid solution and liquid mixture of one or more metals with a second material, said second material may be a metal, a non-metal or another alloy. The term solid solution refers to a single phase solution where all metallic grains (crystals) are of the same composition. Meanwhile, the liquid mixture of a metals refers to two or more solution, forming a microstructure of different crystals within the metal.

Cobalt nickel based alloys have great performance due to their thermal stability, corrosion and wear resistance. They have been historically used in a broad type of purposes: blades for gas turbines and aircraft jet engines, cutting tools for machining, mining and foundation drilling, sports usage, surgical instruments, orthopaedic implants or jewellery. The Cobalt and Nickel form hard metal blends with chromium or tungsten carbide. In those mixtures, Cobalt and Nickel are wetting other metal particles forming the cemented carbides. Apart from the hard metal alloys, the cobalt is also used also as an alloy with samarium for permanent magnets fabrication.

As it is disclosed above, in an embodiment the metal residue is a "metal catalyst". The term "metal catalyst" refers to a catalyst mostly or exclusively comprised of one or more metals or more commonly one or more metal oxides. The metal catalyst may consist of metal(s), metal oxide(s) or mixture thereof alone, or alternatively, it may comprise metal(s), metal oxide(s) or mixture thereof dispersed on a support such as alumina. The term "catalyst" is a substance which increases the rate of a chemical reaction.

Cobalt catalysts are highly active reagents, extensively applied in the efficient and selective synthesis of new chemical products and in oil desulphurisation processes. The oxidation-reduction properties of cobalt allow for different valences, transferring electrons easily between these states and speeding up reactions.

As it is mentioned above, step A) comprises leaching a metal residue, particularly spent battery. The term "leaching" refers to a process for separating useful metals such as Cobalt, Nickel and Manganese from non-valuable one constituents of the residue implying a extracting step. For the purpose of the invention, the extraction step is performed by mixing the metal residue, particularly the spent battery, with a leaching solution comprising lactic acid under such reaction conditions to obtain a leaching mixture formed by a filtrate 1 comprising the Cobalt lactate, the Nickel lactate, the Manganese lactate or a mixture thereof and a solid cake 1 formed by the rest of un-reacted and non-valuable constituents of the battery.

In an embodiment, in step A), the leaching solution further comprises one or more organic acids, one or more reducing agents, one or more proton acceptors, one or more solvents and a mixture thereof.

In an embodiment, in step A), the leaching solution further comprises one or more organic acids selected from the group consisting of citric acid, acetic acid, formic acid, malonic acid, maleic acid, succinic acid and tartaric acid. In an embodiment, in step A), the leaching solution further comprises one or more organic acids as defined above in an amount from 2 to 11% by weight in relation to the total weight of the leaching solution; particularly citric acid. In an embodiment, in step A), the leaching solution further comprises one or more organic acids as defined above in an amount from 3 to 9% by weight in relation to the total weight of the leaching solution; particularly citric acid.

In an embodiment, in step A), the leaching solution further comprises one or more reducing agents. The term "reducing agent" refers to any compound that causes another compound to be reduced, thereby leaving the reducing agent in an oxidized state by losing the electrons donated during the reduction. In an embodiment, in step A), the leaching solution further comprises one or more reducing agents selected from the group consisting of non-noble metals, organic reducing agents, hydrogen peroxide and a mixture thereof. In an embodiment, in step A), the leaching solution further comprises one or more non-noble metals reducing agents selected from the group consisting of Cu, Al and a mixture thereof. In an embodiment, in step A), the leaching solution further comprises one or more organic reducing agents selected from the group consisting of ascorbic acid, formic acid, oxalic acid and a mixture thereof. In an embodiment, the weight ratio between the amount of Cobalt, Nickel and Manganese in the residue such as the spent battery (particularly in the black mass) and the amount of reducing agents is lower than 1.8.

In an embodiment, in step A), the leaching solution further comprises one or more proton acceptors. The term "proton acceptor" refers to any compound capable of abstracting a proton. In an embodiment, in step A), the leaching solution further comprises one or more proton acceptors selected from the group consisting of quaternary ammonium containing compounds, quaternary phosphonium containing compounds, aminoacids, sugars and a mixture thereof. In an embodiment, in step A), the leaching solution further comprises one or more proton acceptors being one or more ammonium quaternary containing compounds. In an embodiment, in step A), the leaching solution further comprises one or more proton acceptors selected from the group consisting of choline chloride, tetrabutylammonium chloride, methyltriphenylphosphonium bromide, betaine, alanine, glycine, proline, glucose, and a mixture thereof.

In an embodiment, in step A), the leaching solution further comprises one or more proton acceptors as defined above in an amount from 5 to 30% in relation to the total weight of the leaching solution; particularly one or more ammonium quaternary containing compounds; more particularly choline chloride. In an embodiment, in step A), the leaching solution further comprises one or more proton acceptors as defined above in an amount from 8 to 24% in relation to the total weight of the leaching solution; particularly one or more ammonium quaternary containing compounds; more particularly choline chloride choline chloride.

In an embodiment, in step A), the leaching solution further comprises one or more solvents selected from the group consisting of water and a mixture of water with one or more water miscible organic solvents. In step A), the leaching solution further comprises one or more solvents in an amount equal to or lower than 10% in relation to the total weight of the leaching solution; particularly water.

In an embodiment, in step A), the leaching solution further comprises a mixture of water with one or more water miscible organic solvents. The term "miscible organic solvent" refers to an organic solvent that, when combined, form a single phase, which means that the mixture thus obtained is "monophasic" under specified conditions of component concentrations and temperature among others. Further, the term "water-miscible organic solvent" refers to an organic solvent that can form a monophasic solution with water at the temperature at which the mixture or reaction is carried out. As used herein, the term "monophasic" refers to a mixture or reaction medium that includes only one liquid phase, and also a method employing such a mixture or reaction medium. In an embodiment, in step A), the leaching solution further comprises a mixture of water with one or more water miscible organic solvents selected from the group consisting of ($C_1$-$C_6$) alcohol, glycols, ($C_1$-$C_4$) alkyl-CO—($C_1$-$C_4$) alkyl, ($C_1$-$C_4$) alkyl-CO—O—($C_1$-$C_4$) alkyl, cyclo($C_5$-$C_6$)alkane, phenyl-($C_1$-$C_4$)alkyl and halogen-($C_1$-$C_4$)alkane.

The term "glycol" refers to a straight or branched chain alkane having at least two hydroxyl substituents. Commonly, the glycol comprises from two to twelve carbon atoms (i.e. ($C_2$-$C_{12}$) glycol). For the purpose of the invention, the term "glycol" also encompasses polymeric versions of the glycols described herein. For example, reference to a "$C_2$ glycol" is intended to include both ethylene glycol and polyethylene glycol. Nonlimiting examples of glycols include, but without limitation, methylene glycol, ethylene glycol, propylene glycol, butylene glycol, polyethylene glycol (PEG), and hexylene glycol. The glycol compounds may contain chiral centers and therefore may exist in different enantiomeric and diastereomeric forms. Additionally, different regioisomers of the glycol compound may exist. Any regioisomers, any optical isomers and any stereoisomers of these compounds and mixtures thereof, are also encompassed in the term "glycol" and can be used in the invention. In an embodiment, the water miscible organic solvents is one or more glycols, particularly polyethylene glycol (PEG).

The term "alcohol" refers to an "alkane" wherein at least one hydrogen atom is substituted by a hydroxyl group and which contains the number of carbon atoms specified in the description or claims. The term "alkane" refers to a saturated, branched or linear hydrocarbon which contains the number of carbon atoms specified in the description or claims. Examples include methanol, ethanol, n-propanol, iso-propanol, butanol, iso-butanol, and sec-butanol. The term "alkyl" is as defined above. In an embodiment, step (a) is performed in the presence of ethyl acetate. The term cycloalkane refers to a "cyclic" alkane which contains the number of carbon atoms specified in the description or claims. The term cycloalkane includes carbocyclic alkanes or heterocyclic alkanes. The term "carbocyclic" alkane refers to a cyclic alkane being each member of the cycle a carbon atom. Examples of carbocyclic alkanes include cyclopentane and cyclohexane. The term "heterocyclic" alkane refers to a "carbocyclic" compound in that at least one carbon atom is substituted by a N, NH, O, or S atom. Examples of heterocyclic alkane include tetrahydrofurane and tetrahydropirane. The term "halogen-alkane" refers to an alkane in that at least one hydrogen atom is substituted by an halogen atom and which contains the number of carbon atoms specified in the description or claims. Examples of halogen-alkane include chloroform, trichloroethane and dichloroethane. In an embodiment, in step A), the leaching solution further comprises a mixture of water with one or more water miscible organic solvents selected from the group consisting of acetone, ethyl acetate, water, cyclohexane, chloroform, tetrahydrofuran, toluene, dichloromethane and mixture thereof.

Where in step A), the leaching solution further comprises a mixture of water with one or more water miscible organic solvents, then the amount of the one or more water miscible organic solvents is equal to or lower than 10% by weight of the weight of the water mixture.

In an embodiment, in step A), the leaching solution further comprises water as a solvent.

In an embodiment, in step A) the leaching solution comprises lactic acid and one or more solvents; particularly water. In an embodiment, in step A) the leaching solution consists of lactic acid and one or more solvents; particularly water. In an embodiment, in step A) the leaching solution consists of lactic acid and water.

In an embodiment, in step A) the leaching solution comprises lactic acid, one or more organic acids, one or more proton acceptors and one or more solvents. In an embodiment, in step A) the leaching solution comprises lactic acid, citric acid, choline chloride and water. In an embodiment, in step A) the leaching solution consist of lactic acid, one or more organic acids, one or more proton acceptors and one or more solvents. In an embodiment, in step A) the leaching solution consist of lactic acid, citric acid, choline chloride and water.

In an embodiment, in step A) the amount of lactic acid in the leaching solution as defined in the present invention is from 10% to 80% by weight of lactic acid in relation to the total weight of the leaching solution. In an embodiment, in step A) the leaching solution comprises lactic acid and one or more solvents; particularly water; and the amount of lactic acid is from 10% to 40% by weight of lactic acid in relation to the total weight of the leaching solution. In an embodiment, in step A) the leaching solution comprises lactic acid and one or more solvents; particularly water; and the amount of lactic acid is from 11% to 38% by weight of lactic acid in relation to the total weight of the leaching solution. In an embodiment, in step A) the leaching solution comprises lactic acid and one or more solvents; particularly water; and the amount of lactic acid is from 25% to 38% by weight of lactic acid in relation to the total weight of the leaching solution. In an embodiment, in step A) the leaching solution comprises lactic acid and one or more solvents; particularly water; and the amount of lactic acid is from 30% to 38% by weight of lactic acid in relation to the total weight of the leaching solution. In an embodiment, in step A) the leaching solution comprises lactic acid and one or more solvents; particularly water; and the amount of lactic acid is about 36% by weight of lactic acid in relation to the total weight of the leaching solution.

In an embodiment, in step A) the leaching solution consist of lactic acid and one or more solvents; particularly water; and the amount of lactic acid is from 10% to 80% by weight of lactic acid in relation to the total weight of the leaching solution. In an embodiment, in step A) the leaching solution consist of lactic acid and one or more solvents; particularly water; and the amount of lactic acid is from 10% to 40% by weight of lactic acid in relation to the total weight of the leaching solution. In an embodiment, in step A) the leaching solution consist of lactic acid and one or more solvents; particularly water; and the amount of lactic acid is from 11% to 38% by weight of lactic acid in relation to the total weight of the leaching solution. In an embodiment, in step A) the leaching solution consist of lactic acid and one or more solvents; particularly water; and the amount of lactic acid is from 25% to 38% by weight of lactic acid in relation to the total weight of the leaching solution. In an embodiment, in step A) the leaching solution consist of lactic acid and one or more solvents; particularly water; and the amount of lactic acid is from 30% to 38% by weight of lactic acid in relation to the total weight of the leaching solution. In an embodiment, in step A) the leaching solution consist of lactic acid and one or more solvents; particularly water; and the amount of lactic acid is about 36% by weight of lactic acid in relation to the total weight of the leaching solution. In a particular embodiment, the leaching solution of step A) consist of about 36% of lactic acid and about 64% of water.

The term "about" or "around" as used herein refers to a range of values ±10% of a specified value. For example, the expression "about 36" or "around 36" includes ±10% of 10, i.e. from 32.4 to 39.6.

In an embodiment, in step A), the leaching solution further comprises one or more organic acids, one or more reducing agents, one or more proton acceptors, one or more solvents and a mixture thereof; wherein the amount of the lactic acid is from 10% to 40% by weight of lactic acid in relation to the total weight of the leaching solution; particularly from 11% to 38% by weight; and more particularly from 11% to 31% by weight. In an embodiment, in step A) the leaching solution comprises lactic acid, one or more organic acids, one or more proton acceptors and one or more solvents as defined above; wherein the amount of lactic acid is from 10% to 40% by weight of lactic acid in relation to the total weight of the leaching solution; particularly from 11% to 38% by weight; and more particularly from 11% to 31% by weight. In an embodiment, in step A) the leaching solution comprises lactic acid, citric acid, choline chloride and water; wherein the amount of lactic acid is from 10% to 40% by weight of lactic acid in relation to the total weight of the leaching solution; particularly from 11% to 38% by weight; and more particularly from 11% to 31% by weight.

In an embodiment, in step A) the leaching solution consist of lactic acid, one or more organic acids, one or more proton acceptors and one or more solvents; wherein the amount of lactic acid is from 10% to 40% by weight of lactic acid in relation to the total weight of the leaching solution; particularly from 11% to 38% by weight; and more particularly from 11% to 31% by weight.

In an embodiment, in step A) the leaching solution consist of lactic acid, citric acid, choline chloride and water;

wherein the amount of lactic acid is from 10% to 40% by weight of lactic acid in relation to the total weight of the leaching solution; particularly from 11% to 38% by weight; and more particularly from 11% to 31% by weight.

In an embodiment, in step A) the leaching solution comprises:
- from 10 to 40% by weight of lactic acid in relation to the total weight of the leaching solution;
- from 5 to 30% of one or more proton acceptors; particularly ammonium quaternary containing compounds; particularly choline chloride in relation to the total weight of the leaching solution;
- from 2 to 11% by weight of one or more organic acids; particularly citric acid in relation to the total weight of the leaching solution; and
- enough quantity of water up to 100% by weight.

In an embodiment, in step A) the leaching solution comprises:
- from 11 to 38% by weight of lactic acid in relation to the total weight of the leaching solution;
- from 8 to 24% of one or more proton acceptors; particularly ammonium quaternary containing compounds; particularly choline chloride in relation to the total weight of the leaching solution;
- from 3 to 9% by weight of one or more organic acids; particularly citric acid in relation to the total weight of the leaching solution; and
- enough quantity of water up to 100% by weight.

In an embodiment, in step A) the leaching solution comprises:
- from 11 to 31% by weight of lactic acid in relation to the total weight of the leaching solution;
- from 8 to 24% of one or more proton acceptors; particularly ammonium quaternary containing compounds; particularly choline chloride in relation to the total weight of the leaching solution;
- from 3 to 9% by weight of one or more organic acids; particularly citric acid in relation to the total weight of the leaching solution; and
- enough quantity of water up to 100% by weight.

In an embodiment, in step A) the leaching solution consists of:
- from 10 to 40% by weight of lactic acid in relation to the total weight of the leaching solution;
- from 5 to 30% of one or more proton acceptors; particularly ammonium quaternary containing compounds; particularly choline chloride in relation to the total weight of the leaching solution;
- from 2 to 11% by weight of one or more organic acids; particularly citric acid in relation to the total weight of the leaching solution; and
- enough quantity of water up to 100% by weight.

In an embodiment, in step A) the leaching solution consists of:
- from 11 to 38% by weight of lactic acid in relation to the total weight of the leaching solution;
- from 8 to 24% of one or more proton acceptors; particularly ammonium quaternary containing compounds; particularly choline chloride in relation to the total weight of the leaching solution;
- from 3 to 9% by weight of one or more organic acids; particularly citric acid in relation to the total weight of the leaching solution; and
- enough quantity of water up to 100% by weight.

In an embodiment, in step A) the leaching solution consists of:
- from 11 to 31% by weight of lactic acid in relation to the total weight of the leaching solution;
- from 8 to 24% of one or more proton acceptors; particularly ammonium quaternary containing compounds; particularly choline chloride in relation to the total weight of the leaching solution;
- from 3 to 9% by weight of one or more organic acids; particularly citric acid in relation to the total weight of the leaching solution; and
- enough quantity of water up to 100% by weight.

In an embodiment, in step A) the leaching solution comprises:
- 31% by weight of lactic acid in relation to the total weight of the leaching solution;
- 24% of one or more proton acceptor; particularly ammonium quaternary containing compounds; particularly choline chloride in relation to the total weight of the leaching solution;
- 9% by weight of one or more organic acids; particularly citric acid in relation to the total weight of the leaching solution; and
- enough quantity of water up to 100% by weight.

In an embodiment, in step A) the leaching solution consist of:
- 31% by weight of lactic acid in relation to the total weight of the leaching solution;
- 24% of one or more proton acceptors; particularly ammonium quaternary containing compounds; particularly choline chloride in relation to the total weight of the leaching solution;
- 9% by weight of one or more organic acids; particularly citric acid in relation to the total weight of the leaching solution; and
- 36% of water.

In an embodiment, in step A) the leaching solution comprises:
- 20% by weight of lactic acid in relation to the total weight of the leaching solution;
- 15% of one or more proton acceptors; particularly ammonium quaternary containing compounds; particularly choline chloride in relation to the total weight of the leaching solution;
- 6% by weight of one or more organic acids; particularly citric acid in relation to the total weight of the leaching solution; and
- enough quantity of water up to 100% by weight.

In an embodiment, in step A) the leaching solution consist of:
- 20% by weight of lactic acid in relation to the total weight of the leaching solution;
- 15% of one or more proton acceptors; particularly ammonium quaternary containing compounds; particularly choline chloride in relation to the total weight of the leaching solution;
- 6% by weight of one or more organic acids; particularly citric acid in relation to the total weight of the leaching solution; and
- 59% of water.

In an embodiment, in step A) the leaching solution consist of:
- 31% by weight of lactic acid in relation to the total weight of the leaching solution;
- 24% of one or more proton acceptors; particularly ammonium quaternary containing compounds; particularly choline chloride in relation to the total weight of the leaching solution;

9% by weight of one or more organic acids; particularly citric acid in relation to the total weight of the leaching solution; and 36% of water.

In an embodiment, in step A) the leaching solution comprises:

11% by weight of lactic acid in relation to the total weight of the leaching solution;

8% of one or more proton acceptors; particularly ammonium quaternary containing compounds; particularly choline chloride in relation to the total weight of the leaching solution;

3% by weight of one or more organic acids; particularly citric acid in relation to the total weight of the leaching solution; and enough quantity of water up to 100% by weight.

In an embodiment, in step A) the leaching solution consist of:

11% by weight of lactic acid in relation to the total weight of the leaching solution;

8% of one or more proton acceptors; particularly ammonium quaternary containing compounds; particularly choline chloride in relation to the total weight of the leaching solution;

3% by weight of one or more organic acids; particularly citric acid in relation to the total weight of the leaching solution; and 78% of water.

In an embodiment, step A) is performed at a temperature from 20° C. to 100° C. In an embodiment, step A) is performed at a temperature from 50 to 100° C. In an embodiment, step A) is performed at a temperature from 55° C. to 85° C.

In an embodiment, step A) is performed for a period from 20 min to 24 h. In an embodiment, step A) is performed for a period from 30 min to 10 h. In an embodiment, step A) is performed for a period from 30 min to 4 h.

In an embodiment, step A) further comprises adding to the resulting leaching mixture one or more additives. In an embodiment, step A) further comprises adding to the resulting leaching mixture one or more additives selected from the group consisting of reducing agents and oxidizing agents.

In an embodiment, wherein the metal residue, particularly the spent battery, used as starting material of the process of the invention is obtained by mechanical procedures and/or by thermal treatment at low temperature (i.e. below 500° C.), then the process further comprises adding to the resulting leaching mixture one or more reducing agents. The reducing agents can be any one defined above in the present invention. All embodiments disclosed above for the reducing agents in the leaching mixture also apply here by the reducing agents additional added to the leaching mixture. The appropriate reducing agents and their amounts can readily be determined by those skilled in the art according to the type of metal residue, particularly the type of spent batteries, being used as starting material and their metal compositions.

In an embodiment, wherein the metal residue, particularly the spent battery used as starting material of the process of the invention is obtained by thermal treatment at high temperature (i.e. above 500° C.), then the process further comprises adding to the resulting leaching mixture one or more oxidizing agents. The term "oxidizing agent" refers to any compound that causes another material to be oxidized, thereby leaving the oxidizing agent in a reduced state by accepting the electrons removed through oxidation. In an embodiment, the oxidizing agents selected from the group consisting of peroxide, ozone, alkaline or alkaline earth chlorites, and a mixture thereof. In an embodiment, the oxidizing agent is hydrogen peroxide. The appropriate oxidizing agents and their amounts, can readily be determined by those skilled in the art according to the type of metal residue, particularly the spent batteries, being used as starting material and their metal compositions. In an embodiment, the weight ratio between the amount of oxidizing agents and the amount of Cobalt, Nickel and Manganese in the metal residue, such as the spent battery (particularly in the black mass) in the leaching mixture is higher than 2.8.

In an embodiment, step A) comprises leaching the metal residue, particularly the spent battery, with a leaching solution comprising lactic acid to obtain a leaching mixture; maintaining the leaching mixture under the conditions as defined in the present invention for 20 min and 40 min, particularly 30 min; and after that time adding to the leaching mixture one or more additives as defined above. In an embodiment, step A) comprises leaching the metal residue, particularly the spent battery, with a leaching solution comprising lactic acid to obtain a leaching mixture; maintaining the leaching mixture under the conditions as defined in the present invention for 20 min and 40 min, particularly 30 min; after that time adding to the leaching mixture one or more additives as defined above; and maintaining the resulting leaching mixture for a remaining time up to 24 h.

In an embodiment, in step A) the weight relation between the Cobalt, Nickel and Manganese containing metal residue, particularly the spent batteries, and the leaching solution is from 1:5 to 1:70. In an embodiment, in step A) the weight relation between the Cobalt, Nickel and Manganese containing metal residue, particularly the spent batteries, and the leaching solution is from 1:9 to 1:70. In an embodiment, in step A) the weight relation between the Cobalt, Nickel and Manganese containing metal residue, particularly the spent batteries, and the leaching solution is from 1:9 to 1:58. In an embodiment, in step A) the weight relation between the Cobalt, Nickel and Manganese containing metal residue, particularly the spent batteries, and the leaching solution is from 1:9 to 1:58.

As it is mentioned above, the first alterative process of the invention comprises performing step C) of precipitating the Cobalt lactate, the Nickel lactate, the Manganese lactate or a mixture thereof, from the filtrate 1 obtained in step B) to obtain a precipitating mixture formed by a filtrate 2 and a precipitate 1 comprising the Cobalt lactate, the Nickel lactate, the Manganese lactate or a mixture thereof. Step C) implies the precipitation of the Cobalt lactate, the Nickel lactate, the Manganese lactate or a mixture thereof and thus, their selective and effective separation from the rest of unreacted and metal components present in the filtrate 1.

In an embodiment, step C) of the process of the invention is performed at a temperature from 20° C. to 100° C. In an embodiment, step C) is performed at a temperature from 20° C. to 50° C. In an embodiment, step C) is performed at a temperature from 50° C. to 100° C. In an embodiment, step C) is performed at a temperature from 55° C. to 85° C.

In an embodiment, step C) of the process of the invention is performed for the appropriate period of time to obtain a precipitate. In an embodiment, step C) of the process of the invention is performed for a period of time from 20 min to 7 days. In an embodiment, step C) of the process of the invention is performed for a period of time from 20 min to 72 h. In an embodiment, step B) of the process of the invention is performed for a period of time from 30 min to 48 h. In an embodiment, step B) of the process of the invention is performed for a period of time from 30 min to 8 h.

In an embodiment, step C) of the process of the invention is performed at a temperature from 20° C. to 50° C. and for the appropriate period of time to obtain a precipitate. In an embodiment, step C) of the process of the invention is performed at a temperature from 20° C. to 50° C. and for a period of time from 20 min to 7 days. In an embodiment, step C) of the process of the invention is performed at a temperature from 20° C. to 50° C. and for a period of time from 20 min to 72 h. In an embodiment, step B) of the process of the invention is performed at a temperature from 20° C. to 50° C. and for a period of time from 30 min to 48 h. In an embodiment, step B) of the process of the invention is performed at a temperature from 20° C. to 50° C. and for a period of time from 30 min to 8 h. In embodiment, the precipitating yield of Cobalt lactate of step B) is equal to or higher than 50% by weight. In embodiment, the precipitating yield of Nickel lactate of step B) is equal to or higher than 48% by weight. In embodiment, the precipitating yield of the Manganese lactate of step B) is equal to or higher than 32% by weight.

As it is mentioned above, the second alternative process of the invention comprises performing step E) of precipitating the Cobalt lactate, the Nickel lactate, the Manganese lactate or a mixture thereof from the filtrate 1 to obtain a precipitating mixture formed by a filtrate 3 and a solid cake 2 comprising the Cobalt lactate, the Nickel lactate, the Manganese lactate or a mixture thereof and the unreacted (battery) residue sample. Thus, step E) implies the precipitation of the Cobalt lactate, the Nickel lactate, the Manganese lactate or a mixture thereof directly from the leaching mixture without a previous separation of the unreacted (battery) residue sample. Therefore, the solid cake 2 thus obtained are formed by a mixture of the Cobalt lactate, the Nickel lactate, the Manganese lactate or a mixture thereof and the unreacted (battery) residue sample. Nevertheless, regarding the difference of water solubility of the Cobalt lactate, the Nickel lactate, the Manganese lactate or a mixture thereof in comparison with the unreacted (battery) residue sample, the Cobalt lactate, the Nickel lactate, the Manganese lactate or a mixture thereof is easily separated by the addition of water as it is disclosed in step G.

In an embodiment, step E) of the process of the invention is performed at a temperature from 20° C. to 100° C. In an embodiment, step E) is performed at a temperature from 20° C. to 50° C. In an embodiment, step E) is performed at a temperature from 50° C. to 100° C. In an embodiment, step E) is performed at a temperature from 55° C. to 85° C.

In an embodiment, step E) of the process of the invention is performed for the appropriate period of time to obtain a precipitate. In an embodiment, step E) of the process of the invention is performed for a period of time from 20 min to 48 h. In an embodiment, step E) of the process of the invention is performed for a period of time from 30 min to 24 h.

In an embodiment, step E) of the process of the invention is performed at a temperature from 20° C. to 50° C. and for the appropriate period of time to obtain a precipitate. In an embodiment, step E) of the process of the invention is performed at a temperature from 20° C. to 50° C. and for a period of time from 20 min to 48 h. In an embodiment, step E) of the process of the invention is performed at a temperature from 20° C. to 50° C. and for a period of time from 30 min to 24 h.

In embodiment, the precipitating yield of Cobalt lactate of step E) is equal to or higher than 79% by weight. In embodiment, the precipitating yield of Nickel lactate of step E) is equal to or higher than 71% by weight. In embodiment, the precipitating yield of the Manganese lactate of step E) is equal to or higher than 45% by weight.

In an embodiment, each one of the separating steps B), D) and F) of the processes of the present invention is performed by suitable techniques as known to a person skilled in the art for separating a solid and a liquid. For example, by one or more of the following operations: filtration, filtration under vacuum and decantation. In an embodiment, each one of the separating steps B), D) and F) of the processes of the present invention is performed by filtration of the solid.

In an embodiment, each one of the filtration steps defined above B), D) and F) is performed at a temperature from 20° C. to 100° C. In an embodiment, each one of the filtration steps defined above B), D) and F) is performed at a temperature from 20° C. to 50° C. In an embodiment, each one of the filtration steps defined above B), D) and F) is performed at a temperature from 50° C. to 100° C. In an embodiment, each one of the filtration steps defined above B), D) and F) is performed at a temperature from 55° C. to 85° C.

In an embodiment, each one of the precipitating steps C) and E) of the process of the invention is performed at a pH from 1.5 to 5. In an embodiment, each one of the precipitating steps C) and E) of the process of the invention comprises the addition of a pH adjusting agent. In an embodiment, each one of the precipitating steps C) and E) of the process of the invention comprises the addition of a pH adjusting agent in a sufficient amount for having a pH from 1.5 to 5. In an embodiment, each one of the precipitating steps C) and E) of the process of the invention comprises adding lactic acid. In an embodiment, each one of the precipitating steps C) and E) of the process of the invention is performed by the addition of lactic acid, followed by the addition of pH regulating agent. In an embodiment, each one of the precipitating steps C) and E) of the process of the invention is performed by the addition of lactic acid, followed by the addition of pH regulating agent in a sufficient amount for having a pH from 1.5 to 5. In an embodiment, each one of the precipitating steps C) and E) of the process of the invention is performed by the addition of lactate alkali or alkaline earth metal salts. The term "alkali metal salt" refers to a salt formed with alkali metal. Alkali metals are the series of elements included in the Group (I) of the periodic table, which include, lithium (Li), sodium (Na), potassium (K), rubidium (Rb), caesium (Cs), and francium (Fr). The term "alkaline earth metal salt" refers to a salt formed with alkaline earth metal. Alkaline earth metals are the series of elements included in the Group II of the periodic table, which include, beryllium (Be), magnesium (Mg), calcium (Ca), strontium (Sr), barium (Ba) and radium (Ra).

In an embodiment, the process further comprises one or more additional drying steps after filtration steps as defined above (i.e. after steps B), D) and F)). Commonly, each one of the drying steps comprises submitting the filtrate and/or the solid cake under such drying conditions to eliminate partially or totally the amount of solvent and volatile components of the liquid phase to dryness. In an embodiment, the process further comprises partially drying one or more of the filtrate until having the appropriate amount of solvents and volatile components. In an embodiment, the process further comprises partially or totally drying one or more of the solids obtained in the process.

In an embodiment, each one of the drying steps are performed at a temperature from 60° C. to 100° C.; particularly from 80° C. to 100° C. In an embodiment, each one of the drying steps are performed from 1 to 3 h; particularly about 2 hours. In an embodiment, each one of the drying steps are performed under vacuum conditions. Generally, the vacuum involves a pressure comprised from 0.5 mbar to 3 mbar.

In an embodiment, the separating step G) is performed by mixing the solid cake 2 obtained in step F) with a solvent selected from water and a mixture of water with one or more miscible organic solvents to lead a solid cake 3 comprising the unreacted (spent batteries) residues and a filtrate 4 comprising the Cobalt lactate, the Nickel lactate, the Manganese lactate or a mixture thereof. For the purpose of the present invention, the miscible organic solvents as defined above for performing step A) of the process also apply for step F).

In an embodiment, the separating step G) is performed by mixing the solid cake 2 obtained in step F) with water to lead a solid cake 3 comprising the unreacted (spent batteries) residues and a filtrate 4 comprising the Cobalt lactate, the Nickel lactate, the Manganese lactate or a mixture thereof.

In an embodiment, the process further comprises an additional step of isolating the Cobalt, Nickel and Manganese in solid form from the filtrate 4 comprising the Cobalt lactate, the Nickel lactate, the Manganese lactate or a mixture thereof. Commonly, the isolation step is performed by the removal of the liquid phase as defined above for the drying steps or alternatively, adding an additional precipitating agent to obtain the Cobalt, Nickel and Manganese in solid form. Examples of additional precipitating agents for isolating the Cobalt, Nickel and Manganese in solid form include, but without limitation, organic acids such as oxalic acid, acetic acid and formic acid.

The process of the invention is also advantageous because allows recycling one or more of the filtrates obtained during the process which comprises residual or few amount of Cobalt lactate, the Nickel lactate, the Manganese lactate or a mixture thereof. In an embodiment, the process of the invention comprises reusing the filtrate 2 obtained in step D) in step A) as a leaching solution. In an embodiment, the process of the invention comprises reusing the filtrate 3 obtained in step F) in step A) as a leaching solution.

In an embodiment, the reusage of the filtrate 2 and/or filtrate 3 comprises the addition of one or more additive to adjust the amount of organic compounds and the pH.

Appropriate additive can be one or more organic acids, one or more reducing agents, one or more oxidizing agents, one or more proton acceptors, one or more solvents, pH adjusting agents and a mixture thereof.

The appropriate additives, and their amounts, can readily be determined by those skilled in the art according to the composition and pH of the filtrate 2 and the filtrate 3.

All embodiments disclosed above for organic acids, reducing agents, oxidizing agents, proton acceptors, and solvents as defined above, also apply herein for the reconditioning of the filtrates 2 and/or 3 as leaching solution of step A).

The terms "pH adjusting" or "pH regulator" agent have the same meaning and are used interchangeable. They refer to acids or bases that can be used to adjust the pH of the finished composition to the desired level, without affecting the properties of the composition. The acid(s) and/or base(s) may be added to the composition in any suitable form, such as anhydrous, hydrated, aqueous or salt. In an embodiment, the pH adjusting agent is a base. Examples of appropriate bases include alkali metal and alkaline earth metal hydroxides, ammonium hydroxide, substituted ammonium hydroxides (such as primary, secondary, tertiary, or quaternary ammonium hydroxides), and mixtures thereof. In an embodiment, the pH adjusting agent is an acid. Examples of appropriate acids include hydrochloric acid, sulfuric acid and nitric add. The amount of the pH adjusting agent in the composition of the present invention is the appropriate for achieving a pH from 0.5 to 1.5.

The reusage of the filtrate 2 and/or filtrate 3 is especially advantageous because allows increasing the recovery yield of Cobalt, Nickel and Manganese. Particularly, the reusage of the filtrates (i.e. leaching used solutions) which still have some amount of extracted Cobalt lactate, the Nickel lactate, the Manganese lactate or a mixture thereof dissolved in the solution allows in a subsequent cycles of the process their precipitation and therefore, increasing the amount of extracted and isolated Cobalt lactate, the Nickel lactate, the Manganese lactate or a mixture thereof in solid form. In an embodiment, each filtrate 2 and/or filtrate 3 individually obtained is reused as leaching solution. In an embodiment, a mixture of filtrates 2, filtrates 3 or a mixture of filtrates 2 and 3 is performed before its reuse as leaching solution.

The recovery of other metals apart from Cobalt, Nickel and Manganese from the filtrate 2 and/or filtrate 3 is especially advantageous. Particularly, the precipitation of the Cobalt, Nickel and Manganese from the filtrate 2 and/or filtrate 3; and/or the reusage of them as leaching solutions allows increasing the concentration of other valuable metals such as cooper, aluminium and specially lithium. Thus, it is also part of the invention the recovery of additional metals from the filtrate 2 and/or filtrate 3. In an embodiment, the process of the invention further comprises an additional step of submitting the filtrate 2 obtained in step D), the filtrate 3 obtained in step F), a mixture of filtrates 2 obtained in step D), a mixture of filtrate 3 obtained in step F) or a mixture thereof under such conditions to recover one or more metal ion selected from the group consisting of Lithium ion, cooper ion, aluminium ion and a mixture thereof. The appropriate recovery conditions such as solvents, reagents and their amounts, can readily be determined by those skilled in the art according to the type of metal ion which is to be recovered. In an embodiment, the process of the invention further comprises an additional step of submitting the filtrate 2 obtained in step D), the filtrate 3 obtained in step F), a mixture of filtrates 2 obtained in step D), a mixture of filtrate 3 obtained in step F) or a mixture thereof under such conditions to recover lithium ion. In an embodiment, the process of the invention further comprises an additional step of adding alkaline or alkaline earth metal carbonate to the filtrate 2 obtained in step D), the filtrate 3 obtained in step F), a mixture of filtrates 2 obtained in step D), a mixture of filtrate 3 obtained in step F) or a mixture thereof to obtain a precipitate of lithium carbonate (see. W. Gao et al., "Lithium Carbonate Recovery from Cathode Scrap of Spent Lithium-Ion Battery: A Closed-Loop Process," Environ. Sci. Technol., 2017, vol. 51, no. 3, pp. 1662-1669, to obtain lithium carbonate. Then, the lithium carbonate thus obtained is isolated from the reaction media.).

In an embodiment, the extraction yield of the Cobalt ion is equal to or higher than 80% by weight. In an embodiment, the extraction yield of Nickel ion is higher than 73% by weight. In an embodiment, the extraction yield of Manganese ion is higher than 87% by weight.

As it is mentioned above, the process of the invention is an efficient process for the recovery of Cobalt ion, Nickel ion and Manganese ion from metal residues such as spent batteries. In an embodiment, the recovery yield of the Cobalt ion from metal residues is equal to or higher than 50% by weight. In an embodiment, the recovery yield of the Nickel ion from metal residues is equal to or higher than 48% by weight. In an embodiment, the recovery yield of the Manganese ion from metal residues is equal to or higher than 32% by weight. In an embodiment, the recovery yield of the Cobalt ion from metal residues is from 50 to 80% by weight. In an embodiment, the recovery yield of the Nickel ion from metal residues is 48% to 75% by weight. In an embodiment, the recovery yield of the Manganese ion from metal residues is 32% to 51% by weight.

In an embodiment, the selectivity of the recovery of the Cobalt ion, Nickel ion and Manganese ion in relation to the rest of metals of the metal residues such as spent batteries is equal to or higher than 75%.

The process of the invention allows extracting and recovering Cobalt ion, Nickel ion, Manganese ion or a mixture thereof from metal containing residues such as spent batteries in form of Cobalt lactate, Nickel lactate, Manganese lactate or a mixture thereof. The recovered Cobalt lactate, Nickel lactate, Manganese lactate or a mixture thereof thus obtained can be directly used, such as for examples in the field of inks and pigments, catalysts and metal plating finishing baths. Alternatively, the recovered Cobalt lactate, Nickel lactate, Manganese lactate or a mixture thereof can be transformed into other Cobalt, Nickel and/or Manganese containing compounds. In an embodiment, the process of the invention further comprises an additional step of transforming the Cobalt lactate, Nickel lactate, Manganese lactate or a mixture thereof into mixed oxides containing Cobalt, Nickel, Manganese or mixture thereof. Typically, this transformation comprises a calcinating step. In particular, the Cobalt lactate, Nickel lactate, Manganese lactate or a mixture thereof can be firstly mixed with external Co, Ni or Mn compounds (in order to tune the new desired metal ratio chemistry), and with the needed Lithium, among others; and secondly, the mixture thus obtained is calcinated under such appropriate reaction conditions to obtain mixed oxides. The mixed oxides containing Cobalt, Nickel, Manganese or mixture thereof with Lithium, and are used as active cathode material in the preparation of new batteries. In an embodiment, the process of the invention further comprises an additional step of transforming the Cobalt lactate, Nickel lactate, Manganese lactate or a mixture thereof into Cobalt, Nickel and Manganese metal. Typically, this transformation comprises a electroplating step. In particular, the Cobalt lactate, Nickel lactate, Manganese lactate or a mixture thereof are plated. The Cobalt, Nickel and Manganese metal are used as special metal alloys, magnets, electronics and catalysts.

As it is mentioned above, the process of the invention also allows recovering other metals apart from Cobalt, Nickel and Manganese, such as for example Cooper, Aluminium and Lithium from the filtrate 2 and/or filtrate 3. As in the case of Cobalt, Nickel and Manganese, these additional metals are recovered in form of a metal salt. Particularly, in the case of Lithium, it can be recovered in form of Lithium carbonate. These metal salts can be directly used, such as for examples in the field of inks and pigments, catalysts and metal plating finishing baths; or alternatively, these metal salts can be transformed into other metal containing compounds such as metal oxides following an analogous process as disclosed above for Cobalt, Nickel and Manganese. Further, these metal salts can be also transformed into metal following the processes known in the state of the art. For example, the Lithium ion present in the filtrate 2 and/or the filtrate 3 can be recovered in form of Lithium carbonate, which is useful for a broad range of applications, from medication or ceramic industry to fabrication of new Lithium based batteries.

In an embodiment, the process of the present invention is selected from the group consisting of a batch process, a semi-continuous process and a continuous process. In an embodiment, the process of the present invention is selected from the group consisting of a "batch process". The term "batch process" refer to a process that consists of a sequence of one or more steps that should be performed in a defined order. A finite quantity of the final product is produced at the end of the sequence. The same sequence of steps is repeated in order to produce another finite quantity of the final product. Therefore, the stating materials and reagents are added at the beginning or during the reaction processing but discharged at the end of processing. In an embodiment, the process of the present invention is a "continuous process". The term "continuous process" refers to a process wherein the starting materials, reagents and/or fluids (media) that are being processed are continuously in motion, undergoing chemical reactions in a continuous processing. Therefore, starting materials and reagents flows into and out of the process during the entire duration. In an embodiment, the process of the present invention is a "semi-continuous process". The terms "semi-continuous process" and "semi-batch process" have the same meaning and are used interchangeable. They refer to a process that does not neatly fit into either of the above-mentioned categories. In a semi-continuous process, the stating material and reagents can be simultaneously charged and discharged from the process, but for a discrete time period. In an embodiment, the process of the present invention is a "continuous process" or alternatively, a "semi-continuous process" and the process comprises a solid retention system. It is advantageous because it allows performing a continuous or semi-continuous filtration of the solid cakes and/or the precipitation solids reducing the reactor occupation time. In an embodiment, the process of the present invention is a "continuous process" or alternatively, a "semi-continuous process" and the process comprises a decanting zone; particularly a horizontal decanting zone. The dimensions of the decanting zone (i.e. length, diameter, . . . ) and the decanting conditions (i.e. temperature, time, speed flow, . . . ) can readily be determined by those skilled in the art according to the type of metal residue, particularly the type of spent batteries, being used as starting material and their metal compositions.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

General Considerations
Equipment and Materials

Inductively Coupled Plasma Optical Emisión Spectrometry (ICP) metal composition analysis were carried out using a simultaneous spectrometer of Inductively Coupled Plasma Optical Emisión Spectrometry (ICP-OES), model Vista-MPX, CCD Simultaneous (Varian Ltd., Australia).

Calibrations curves were established using aqueous standards by dilution of a 1000 mg/L CertiPUR® (Merck, Germany multielement standard (Ag, Al, B, Ba, Bi, Ca, Cd, Co, Cr, Cu, Fe, Ga, In, K, Li, Mg, Mn, Na, Ni, Pb, Sr, Tl, Zn).

For digestion of solid samples or for dilution aqueous samples, 65% ExpertQ® $HNO_3$, and 37% ExpertQ® HCL supplied by Scherlab (Spain) were used.

Organic composition was analysed by HPLC, using a Waters 2695 HPLC with a Waters 2414 Refractive Index Detector, and a Aminex HPX-87H Column (Bio Rad) with a process temperature of 55° C., using 0.7 ml/min of 0.01N $H2SO4$ solution as carrier.

Sampling

For analysing by ICP, solid input materials or process output solid products, open digestion of a representative aliquots (0.2-1 g) of the different materials were performed in aqua regia (21 ml HCl and 7 ml $HNO_3$) at 130° C. for 1 h. The digested sample were diluted in deionized water up to 100 ml, filtered in order to remove the unsolvable particles (i.e. plastic, carbon) and finally evaluated by ICP-OES.

For analysing liquid streams, dilution of 0.5 g of each sample was performed in 1M HCl (up to 25 ml), and later the samples were evaluated by ICP-OES. For the evolution of kinetics during leaching and precipitation processes extraction of aliquots of 5 g leachate (filtered) were performed in order to take a representative sample, from where a 0.5 g of sample is taken for ICP analysis.

1. Process for recovering Cobalt, Nickel and Manganese

A) Batteries 1.1. Alternative 1

1.1.1. General Process

Leaching Step

A) The leaching media was prepared by mixing the solid and/or liquid organic compounds in a proper dilution ratio with deionized water. The leaching media thus obtained was placed in a 500 ml jacketed reactor with a thermal control and coil condenser for avoiding evaporation with and anchor impeller rotating at 300 rpm until the desired temperature is reached. The mixture was maintained at the same stirring rate, the spent battery residue to be treated was dosed slowly to the reactor avoiding excessive foam formation.

The resulting mixture was maintained for a period of time from 30 min to 24 h. After the initial 30 min, if required (depending on the type of battery residue sample, and thermal pre-treatment used) one or more of the additives disclosed in the present application can added in order to increase the recovery rate.

B) After that time, the suspension was filtered leading to a solid cake 1 of unreacted (battery) residue sample; and a clear filtrate (Filtrate 1) comprising the Cobalt lactate, Nickel lactate and Manganese lactate.

Precipitating Step

C) The clear filtrate (Filtrate 1) was transferred to a reactor at room temperature, and the solution was stirred for a period from 30 min to 7 days until a precipitate was obtained.

D) After that time, the suspension obtained in step C) was filtered leading to a precipitate comprising the Cobalt lactate, Nickel lactate and Manganese lactate (precipitate 1) and a clear filtrate (Filtrate 2).

Regeneration of Filtrate 2

The filtrate 2 can be regenerated and optionally reused as a leaching media in step A) following the herein below regeneration protocol.

Regeneration Protocol:

1. An HPLC analysis of the filtrate 2 was performed in order to measure the amount of each organic compound that remain in solution. Each mole of Ni, Co or Mn that is precipitated will remove from the filtrate two moles of lactic acid that needs to be dosed to recover the original concentration.

The structure of the Cobalt lactate, the Nickel lactate and the Manganese lactate prepared in the process of the present invention is as follows:

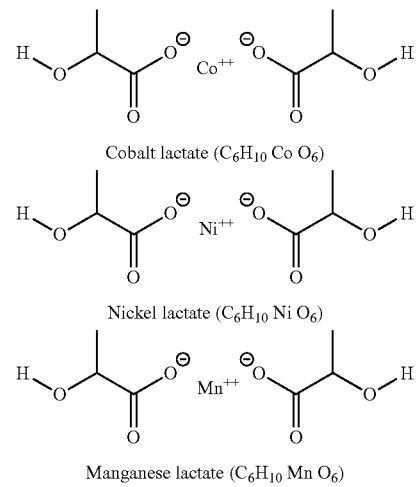

Cobalt lactate ($C_6H_{10}$ Co $O_6$)

Nickel lactate ($C_6H_{10}$ Ni $O_6$)

Manganese lactate ($C_6H_{10}$ Mn $O_6$)

The measurement of the pH of the filtrate 2 was also performed. There is consumption of protons during the reaction due to the leaching reaction of some metals in metallic state (i.e. aluminium) as defined in the following formula:

$$2Al(s)+6H^+(aq) \rightarrow 2Al^{3+}(aq)+3H2(g)\uparrow$$

2. Taking into account the organic compounds in the solution and the pH, the amount of organic compounds needed to recover the original leaching mixture and the amount of protons needed to recover the original pH of the leaching mixture were measured.

3. Addition of the amount of organic compounds (lactic acid and one or more of the additives mentioned in the present invention); and the amount of an strong acid (such as HCl) as measured in steps 2 and 3.

4. The regenerated solution obtained in step 4 is ready for being used as leaching mixture in step A), having the same organic composition and same initial pH than original solution.

Recovery of Additional Metals form Filtrate 2

From the filtrate 2 additional metals can be recovered submitting the filtrate 2 to such reaction conditions that allows the precipitation of the appropriate metal salt.

Lithium Recovery Protocol:

An aqueous saturated solution of $Na_2CO_3$ is added to the filtrate 2 following the process as disclosed in W. Gao et al., "Lithium Carbonate Recovery from Cathode Scrap of Spent Lithium-Ion Battery: A Closed-Loop Process," Environ. Sci. Technol., 2017, vol. 51, no. 3, pp. 1662-1669, to obtain lithium carbonate. Then, the lithium carbonate thus obtained is isolated from the reaction media.

1.1.2. Examples

Example 1

Example 1 was performed following the general process of alternative 1 wherein:

The spent battery residue was a black mass (BM) (32.2 g) obtained from a mixture of portable electronic devices batteries after a mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 3.3 | 24.0 | 5.4 | 0.9 | 2.8 | 0.0 | 0.8 | 9.6 | 0.3 |

The leaching media was prepared by mixing choline chloride (107 g), lactic acid (138 g), citric acid (42 g) and water (195 g). Thus, the leaching mixture comprises:

| choline chloride (%) | lactic acid (%) | citric acid (%) | water(%) |
|---|---|---|---|
| 22 | 29 | 9 | 40 |

The leaching step conditions (step A): the leaching media was rotating at 300 rpm until 55° C. of temperature was reached; and the black mass was dosed slowly (having a solid:liquid ratio of 1:15). The resulting mixture was maintained for 1 h. After that time, a leachate containing Cobalt lactate, Nickel lactate and Manganese lactate was obtained.

The filtering step conditions (step B): After that time, the suspension obtained in step A) was filtered through a glass microfibre filter with a pore size of 1.6 μm leading to a solid cake 1 containing unreacted (battery) residues and a clear filtrate 1 comprising Cobalt lactate, Nickel lactate and Manganese lactate containing the following metal concentration (expressed in ppm analysed by ICP-OES):

| Al | Co | Cu | Fe | Li | Mg | Mn | Ni | Zn |
|---|---|---|---|---|---|---|---|---|
| 2607 | 14119 | 1942 | 278 | 1865 | 19 | 532 | 5475 | 197 |

The precipitating step conditions (step C): The clear filtrates was transferred to a reactor at room temperature, and the solution was stirred for a period of 4 h. After that time, a precipitation of Cobalt lactate, Nickel lactate and Manganese was obtained.

The separation step conditions (step D): the resulting suspension was filtered through a glass microfibre filter with a pore size of 1.6 μm leading to a clear filtrate 2 and a precipitate 1 comprising Cobalt lactate, Nickel lactate and Manganese containing the following metal composition (expressed in % of metal basis analysed by ICP-OES):

| Co (%) | Mn(%) | Ni(%) |
|---|---|---|
| 73.5 | 1.4 | 25.2 |

According to the metals present in the precipitate 1, the recovery yield of:
Cobalt in the precipitate is 62.6%,
Nickel in the precipitate is 47.8%, and
Manganese in the precipitate is 32.3%.

In addition, the mass balance for Cobalt, Nickel and Manganese expressed in % by weight in the different fractions of the process is summarized in the table below:

|  | Co(%) | Ni(%) | Mn(%) |
|---|---|---|---|
| Unreacted residual Black Mass (BM) | 16 | 27 | 13 |
| Leaching used solution | 21.7 | 25.0 | 55 |
| Recovered solid lactates | 62.6 | 47.8 | 32.3 |

Thus, the extraction yield of Cobalt, Nickel and Manganese is measured by the following formula:

Extraction yield=recovery yield (%)+mass balance of leaching used solution (%)

Thus, the extraction yield is the following:
Cobalt is 84.3% (62.6%+21.7%);
Nickel is 72.8% (47.8%+25.0%); and
Manganese is 87.3% (32.3%+55.0%).

Finally, the selectivity of Cobalt, Nickel or Manganese is measured by the following formula:

Selectivity=1−[(Recovery of the metal)/(recovery of the remaining metals)]

Alternatively, the selectivity of Cobalt, Nickel and Manganese is measured by the following formula:

Selectivity=1−[(Recovery of the metals)/(recovery of the remaining metals)]

Thus, the selectivity of Cobalt, Nickel and Manganese versus the remaining metals is 75%.

Regeneration of Filtrate 2

The filtrate 2 can be regenerated following the regeneration protocol as defined above and then be used as a leaching media in step A).

Recovery of Lithium Ion from Filtrate 2

Lithium in form of lithium carbonate can be recovered from the filtrate 2 following the lithium recovery protocol as defined above.

Example 2

Example 2 was performed following the general process of alternative 1 wherein:

The spent battery residue was a black mass (BM) (20.11 g) obtained from a mixture of portable electronic devices batteries after a mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 3.55 | 27.85 | 3.25 | 0.27 | 3.18 | 0.08 | 1.79 | 1.47 | 0.02 |

The leaching media was prepared by mixing choline chloride (34.0 g), lactic acid (43.9 g), citric acid (13.3 g) and water (258.5 g). Thus, the leaching mixture comprises:

| choline chloride (%) | lactic acid (%) | citric acid (%) | water(%) |
|---|---|---|---|
| 9.7% | 12.5% | 3.8% | 73.9% |

The leaching step conditions (step A): the leaching media was rotating at 300 rpm until 55° C. of temperature was reached; and the black mass was dosed slowly (having a solid:liquid ratio of 1:17). The resulting mixture was maintained for 30 min. After that time, a mixture of 0.94 g Cu and 0.34 g Al metallic powders (Scharlab) were dosed into the reactor and the resulting mixture was maintained for 2.5 h.

The filtering step conditions (step B): After that time, the suspension obtained in step A) was filtered through a glass microfibre filter with a pore size of 1.6 µm leading to a solid cake 1 containing unreacted (battery) residues and a clear filtrate 1 comprising Cobalt lactate, Nickel lactate and Magnese lactate containing the following metal concentration (expressed in ppm analysed by ICP-OES):

| Al | Co | Cu | Fe | Li | Mg | Mn | Ni | Zn |
|---|---|---|---|---|---|---|---|---|
| 2342 | 13252 | 3780 | 119 | 2006 | 64 | 1109 | 816 | 20 |

The precipitating step conditions (step C): The clear filtrate was transferred to a reactor at room temperature, and the solution was stirred for a period of 48 h. After that time, a precipitation of Cobalt lactate, Nickel lactate and Manganese lactate was obtained.

The separation step conditions (step D): the resulting the suspension was filtered through a glass microfibre filter with a pore size of 1.6 µm leading to a clear filtrate 2 and a precipitate 1 comprising Cobalt lactate, Nickel lactate and Manganese lactate containing the following metal composition (expressed in % of metal basis analysed by ICP-OES):

| Co(%) | Cu(%) | Mn(%) | Ni(%) | Zn(%) |
|---|---|---|---|---|
| 90.6 | 1.3 | 2.8 | 5.2 | 0.1 |

According to the metals present in the precipitate 1, the recovery yield of:
Cobalt in the precipitate is 50%, and
Nickel in the precipitate is 55%.

In addition, the mass balance for Cobalt and Nickel expressed in % by weight in the different fractions of the process is summarized in the table below:

| | Co(%) | Ni(%) |
|---|---|---|
| Unreacted residual Black Mass (BM) | 6.7 | 5.7 |
| Leaching used solution | 43 | 39 |
| Recovered solid lactates | 50 | 55 |

Thus, the extraction yield is the following:
Cobalt is 93% (50%+43%), and
Nickel is 94% (55%+39%).

Regeneration of Filtrate 2

The filtrate 2 can be regenerated following the regeneration protocol as defined above and then be used as a leaching media in step A).

Recovery of Lithium Ion from Filtrate 2

Lithium in form of lithium carbonate can be recovered from the filtrate 2 following the lithium recovery protocol as defined above.

Example 3

Example 3 was performed following the general process of alternative 1 wherein:

The spent battery residue was a black mass (BM) (20.13 g) obtained from a mixture of portable electronic devices batteries after a light temperature thermo mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 5.4 | 23.1 | 11.2 | 0.7 | 2.5 | 0.0 | 0.6 | 6.9 | 0.2 |

The leaching media was prepared by mixing choline chloride (33.5 g), lactic acid (43.3 g), citric acid (13.1 g) and water (251.5 g). Thus, the leaching mixture comprises:

| choline chloride (%) | lactic acid (%) | citric acid (%) | water(%) |
|---|---|---|---|
| 9.8% | 12.7% | 3.8% | 73.7% |

The leaching step conditions (step A): the leaching media was rotating at 300 rpm until 55° C. of temperature was reached; and the black mass was dosed slowly (having a solid:liquid ratio of 1:17). The resulting mixture was maintained for 3 h. After that time, a leachate containing Cobalt lactate, Nickel lactate and Manganese lactate was obtained.

The filtering step conditions (step B): After that time, the suspension obtained in step A) was filtered through a glass microfibre filter with a pore size of 1.6 µm leading to a solid cake 1 containing unreacted (battery) residues and a clear filtrate 1 comprising Cobalt lactate, Nickel lactate and Manganese lactate containing the following metal concentration (expressed in ppm analysed by ICP-OES):

| Al | Co | Cu | Fe | Li | Mg | Mn | Ni | Zn |
|---|---|---|---|---|---|---|---|---|
| 1809 | 13861 | 2821 | 353 | 1860 | 23 | 384 | 3918 | 136 |

The precipitating step conditions (step C): The clear filtrates was transferred to a reactor at room temperature, and the solution was stirred for a period of 48 h. After that time, a precipitation of Cobalt lactate, Nickel lactate and Manganese lactate was obtained.

The separation step conditions (step D): the resulting the suspension was filtered through a glass microfibre filter with a pore size of 1.6 µm leading to a clear filtrate 2 and a precipitate 1 comprising Cobalt lactate, Nickel lactate and Manganese lactate containing the following metal composition (expressed in % of metal basis analysed by ICP-OES):

| Co(%) | Mn(%) | Ni(%) | Zn(%) |
|---|---|---|---|
| 74.72 | 1.00 | 21.03 | 2.17 |

According to the metals present in the precipitate 1, the recovery yield of:
Cobalt in the precipitate is 53.5%, and
Nickel in the precipitate is 52.2%.

In addition, the mass balance for Cobalt and Nickel expressed in % by weight in the different fractions of the process is summarized in the table below:

| | Co(%) | Ni(%) |
|---|---|---|
| Unreacted residual Black Mass (BM) | 0.9 | 2.6 |
| Leaching used solution | 45.6 | 45.3 |
| Recovered solid lactates | 53.5 | 52.2 |

Thus, the extraction yield is the following:
Cobalt is 99.1% (53.5%+45.6%), and
Nickel is 97.5% (52.2%+45.3%).

Regeneration of Filtrate 2

The filtrate 2 can be following the regeneration protocol as defined above and then be used as a leaching media in step A).

Recovery of Lithium Ion from Filtrate 2

Lithium in form of lithium carbonate can be recovered from the filtrate 2 following the lithium recovery protocol as defined above.

Example 4

Example 4 was performed following the general process of alternative 1 wherein:

The spent battery residue was a black mass (BM) (12.42 g) obtained from a mixture of portable electronic devices batteries after a mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 3.26 | 24.0 | 5.4 | 0.9 | 2.8 | 0.036 | 0.78 | 9.6 | 0.3 |

The leaching media was prepared by mixing lactic acid (130.0 g) and water (233.0 g). Thus, the leaching mixture comprises:

| lactic acid (%) | water(%) |
|---|---|
| 36% | 64% |

The leaching step conditions (step A): the leaching media was rotating at 260 rpm until 55° C. of temperature was reached; and the black mass was dosed slowly (having a solid:liquid ratio of 1:29). The resulting mixture was maintained for 3 h. After that time, a leachate containing Cobalt lactate, Nickel lactate and Manganese lactate was obtained.

The filtering step conditions (step B): After that time, the suspension obtained in step A) was filtered through a glass microfibre filter with a pore size of 1.6 μm leading to a solid cake 1 containing unreacted (battery) residues and a clear filtrate 1 Cobalt lactate, Nickel lactate and Manganese lactate containing the following metal concentration (expressed in ppm analysed by ICP-OES):

| Al | Co | Cu | Fe | Li | Mg | Mn | Ni | Zn |
|---|---|---|---|---|---|---|---|---|
| 564 | 7144 | 684 | 149 | 911 | 9 | 253 | 2841 | 99 |

The precipitating step conditions (step C): The clear filtrates was transferred to a reactor at room temperature, and the solution was stirred for a period of 24 h. After that time, a precipitation of Cobalt lactate, Nickel lactate and Manganese lactate was obtained.

The separation step conditions (step D): the resulting suspension was filtered through a glass microfibre filter with a pore size of 1.6 μm leading to a clear filtrate 2 and a precipitate 1 comprising Cobalt lactate, Nickel lactate and Manganese lactate containing the following metal composition (expressed in % of metal basis analysed by ICP-OES):

| Co(%) | Mn(%) | Ni(%) | Zn(%) |
|---|---|---|---|
| 69.9 | 1.3 | 27.9 | 0.9 |

According to the metals present in the precipitate 1, the recovery yield of:
Cobalt in the precipitate is 71.1%, and
Nickel in the precipitate is 68.9%.

In addition, the mass balance for Cobalt and Nickel expressed in % by weight in the different fractions of the process is summarized in the table below:

|  | Co(%) | Ni(%) |
|---|---|---|
| Unreacted residual Black Mass (BM) | 9.9 | 13 |
| Leaching used solution | 19.0 | 18.0 |
| Recovered solid lactates | 71.1 | 68.9 |

Thus, the extraction yield is the following:
Cobalt is 90.1% (71.1%+19.0%), and
Nickel is 96.9% (68.9%+18.0%).

Regeneration of Filtrate 2

The filtrate 2 can be following the regeneration protocol as defined above and then be used as a leaching media in step A).

Recovery of Lithium Ion from Filtrate 2

Lithium in form of lithium carbonate can be recovered from the filtrate 2 following the lithium recovery protocol as defined above.

1.2. Alternative 2

1.2.1. General Process

Leaching Step

A) The leaching media was prepared by mixing the solid and/or liquid organic compounds in a proper dilution ratio with deionized water. The leaching media thus obtained was placed in a 500 ml jacketed reactor with a thermal control and coil condenser for avoiding evaporation with and anchor impeller rotating at 300 rpm until the desired temperature is reached. The mixture was maintained at the same stirring rate, the spent battery residue to be treated was dosed slowly to the reactor avoiding excessive foam formation.

The resulting mixture was maintained for a period of time from 30 min to 24 h. After the initial 30 min, if required (depending on the type of battery residue sample) one or more of the additives disclosed in the present application can added in order to increase the recovery rate.

Precipitating Step

E) After that time, the resulting mixture was cooled down to room temperature and the stirring was maintained for a period of time from 30 min to 7 days until a precipitation of Cobalt lactate, the Nickel lactate, the Manganese lactate or a mixture thereof was obtained.

F) After that time, the suspension obtained in step E) was filtered through a glass microfibre filter with a pore size of 1.6 μm leading to a solid cake 2 comprising the Cobalt lactate, the Nickel lactate, the Manganese lactate or a mixture thereof and the unreacted (battery) residue sample; and a clear filtrate 3 comprising most of the metals present in the original battery sample (for example Cu, Al, Mn and Fe) and with a low amount of non-precipitating Co and Ni.

G) The solid cake 2 obtained in step F) was washed with water, leading to a solid cake 3 comprising the unreacted (battery) residue sample; and a clear filtrate 4 comprising the Cobalt lactate, the Nickel lactate, the Manganese lactate or a mixture thereof.

The aqueous filtrate 4 thus obtained can be dried at 80° C. overnight to dryness to lead a dried solid containing the Cobalt lactate, the Nickel lactate, the Manganese lactate or a mixture thereof.

Regeneration of Filtrate 3

The filtrate 3 can be regenerated following the regeneration protocol as defined above and then be used as a leaching media in step A).

Recovery of Additional Metals from Filtrate 3

From the filtrate 3 additional metals can be recovered submitting the filtrate 3 to such reaction conditions that allows the precipitation of the appropriate metal salt.

Recovery of Lithium Ion from Filtrate 3

Lithium in form of lithium carbonate can be recovered from the filtrate 3 following the lithium recovery protocol as defined above for the filtrate 2 but using the filtrate 3 instead of filtrate 2.

1.2.2. Examples

Example 5

Example 5 was performed following the general process of alternative 2 wherein:

The spent battery residue was a black mass (BM) (44.4 g) obtained from a mixture of portable electronic devices batteries after a mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 3.3 | 24.0 | 5.4 | 0.9 | 2.8 | 0.0 | 0.8 | 9.6 | 0.3 |

The leaching media was prepared by mixing choline chloride (74 g), lactic acid (95 g), citric acid (29 g) and water (202 g). Thus, the leaching mixture comprises:

| choline chloride (%) | lactic acid (%) | citric acid (%) | water(%) |
|---|---|---|---|
| 18.5% | 23.8% | 7.2% | 50.5% |

The leaching step conditions (step A): the leaching media was rotating at 300 rpm until 55° C. of temperature was reached; and the black mass was dosed slowly (having a solid:liquid ratio of 1:9). The resulting mixture was maintained for 5 h with no extra additives dossing.

The precipitating step conditions (step E): After that time, the heating of the reactor was disconnected letting the mix to cool down and the stirring was maintained for 0.5 h until a precipitate was obtained. The suspension obtained was filtered (step F) leading to a solid cake 2 comprising Cobalt lactate, Nickel lactate and Manganese lactate compounds and the unreacted black mass of the battery residue; and a clear filtrate 3 containing the following metal concentration (expressed in ppm):

| Al | Co | Cu | Fe | Li | Mg | Mn | Ni | Zn |
|---|---|---|---|---|---|---|---|---|
| 4938 | 4868 | 5416 | 460 | 3586 | 20 | 489 | 2443 | 203 |

The solid cake 2 was washed with 1l of deionized water (step G), leading to 12.7 g of solid cake 3 containing the unreacted BM having the following metal concentration (expressed in % by weight in relation to the weight of the residue):

| Al | Co | Cu | Fe | Li | Mg | Mn | Ni | Zn |
|---|---|---|---|---|---|---|---|---|
| 0.12 | 0.83 | 1.83 | 0.03 | 0.06 | 0.00 | 0.02 | 1.63 | 0.01 |

According to the metals present in the solid cake 2, the recovery yield of:
Cobalt is of 80%,
Nickel is of 71%, and
Manganese is of XX %.

In addition, the mass balance for Cobalt, Nickel and Manganese expressed in % by weight in the different fractions of the process is summarized in the table below:

|  | Co(%) | Ni(%) | Mn(%) |
|---|---|---|---|
| Leaching used solution (after filtering) | 19 | 24 | 48.8 |
| Re-dissolved lactates solution | 80 | 71 | 50.7 |
| Unreacted residual BM | 1 | 5 | 0.5 |

Thus, the extraction yield is the following:
Cobalt is 99% (80%+19%),
Nickel is 95% (71%+24%), and
Manganese is 99.5% (48.8%+50.7%).

And, the selectivity of Cobalt, Nickel and Manganese versus the remaining metals is 76%.

Regeneration of Filtrate 3

The filtrate 3 can be following the regeneration protocol as defined above and then be used as a leaching media in step A).

Recovery of Lithium ion from Filtrate 3

Lithium in form of lithium carbonate can be recovered from the filtrate 3 following the lithium recovery protocol as defined above for the filtrate 2 but using the filtrate 3 instead of filtrate 2.

Example 6

Example 6 was performed following the general process of alternative 2 wherein:

The spent battery residue was a black mass (BM) (12.4 g) obtained from a mixture of portable electronic devices batteries after a mechanical process having the following composition:

| Al(%) | Co(%) | Cu(%) | Fe(%) | Li(%) | Mg(%) | Mn(%) | Ni(%) | Zn(%) |
|---|---|---|---|---|---|---|---|---|
| 3.3 | 24.0 | 5.4 | 0.9 | 2.8 | 0.0 | 0.8 | 9.6 | 0.3 |

The leaching media was prepared by mixing lactic acid (130.0 g) and water (233.0 g). Thus, the leaching mixture comprises:

| lactic acid (%) | water(%) |
|---|---|
| 36% | 64% |

The leaching step conditions (step A): the leaching media was rotating at 240 rpm until 55° C. of temperature was reached; and the black mass was dosed slowly (having a solid:liquid ratio of 1:9). The resulting mixture was maintained for 6.7 h with no extra additives dossing.

The precipitating step conditions (step E): After that time, the heating of the reactor was disconnected letting the mix to cool down and the stirring was maintained for 24 h until a precipitate was obtained. The suspension obtained was filtered (step F) leading to a solid cake 2 comprising Cobalt lactate, Nickel lactate and Manganese lactate compounds and the unreacted black mass of the battery residue; and a clear filtrate 3 containing the following metal concentration (expressed in ppm):

| Al | Co | Cu | Fe | Li | Mg | Mn | Ni | Zn |
|---|---|---|---|---|---|---|---|---|
| 494 | 1509 | 694 | 127 | 924 | 9 | 145 | 589 | 28 |

The solid cake 2 was washed with 1 l of deionized water (step G), leading to 2.8 g of solid cake 3 containing the unreacted BM having the following metal concentration (expressed in % by weight in relation to the weight of the residue):

| Al | Co | Cu | Fe | Li | Mg | Mn | Ni | Zn |
|---|---|---|---|---|---|---|---|---|
| 5.2 | 1.9 | 8.7 | 0.6 | 0.2 | 0.01 | 0.04 | 2.8 | 0.01 |

According to the metals present in the solid cake 2, the recovery yield of:
Cobalt is of 79.1%,
Nickel is of 75.2%, and
Manganese is of 45%.

In addition, the mass balance for Cobalt, Nickel and Manganese expressed in % by weight in the different fractions of the process is summarized in the table below:

|  | Co(%) | Ni(%) | Mn(%) |
|---|---|---|---|
| Leaching used solution (after filtering) | 19 | 18 | 54 |
| Re-dissolved lactates solution | 79.1 | 75.2 | 45 |
| Unreacted residual BM | 1.9 | 6.8 | 1 |

Thus, the extraction yield is the following:
Cobalt is 98.1% (79.1%+19%),
Nickel is 93.2% (75.2%+18%), and
Manganese is 99% (54%+45%).

And, the selectivity of Cobalt, Nickel and Manganese versus the remaining metals is 84%.

Regeneration of Filtrate 3

The filtrate 3 can be following the regeneration protocol as defined above and then be used as a leaching media in step A).

Recovery of Lithium ion from Filtrate 3

Lithium in form of lithium carbonate can be recovered from the filtrate 3 following the lithium recovery protocol as defined above for the filtrate 2 but using the filtrate 3 instead of filtrate 2.

B) Catalysts 1.2. Alternative 1

1.2.1. General Process

The processes of leaching, precipitation and regeneration of spent solutions are carried out in similar way to those disclosed above for batteries.

1.2.2. Examples

Example 7

Example 7 was performed following the general process of alternative 1 wherein:

The spent catalyst residue was a CoMo hydrodesulfurization (HDS) catalyst (80.1 g) after a milling process (<250 μm) having the following composition:

| Al(%) | Co(%) | Mo(%) |
|---|---|---|
| 28.9 | 2.2 | 11.147 |

The leaching media was prepared by mixing choline chloride (34.2 g), lactic acid (44.1 g), citric acid (13.4 g) and water (257 g). Thus, the leaching mixture comprises:

| choline chloride (%) | lactic acid (%) | citric acid (%) | water(%) |
|---|---|---|---|
| 10 | 13 | 4 | 74 |

The leaching step conditions (step A): the leaching media was rotating at 300 rpm until 55° C. of temperature was reached; and the catalyst powder mass was dosed slowly (having a solid:liquid ratio of 1:4.4). The resulting mixture was maintained for 3 h. After that time, a leachate containing Cobalt lactate, and other impurity metals was obtained.

The filtering step conditions (step B): After that time, the suspension obtained in step A) was filtered through a glass microfibre filter with a pore size of 1.6 μm leading to a solid cake 1 containing unreacted (catalyst) residues and a clear filtrate 1 comprising Cobalt lactate, containing the following metal concentration (expressed in ppm analysed by ICP-OES):

| Al | Co | Cu | Fe | Li | Vg | Mn | Ni | Zn | Mo |
|---|---|---|---|---|---|---|---|---|---|
| 6713 | 3590 | 2 | 12 | 0 | 5.6 | 511 | 9 | 5.9 | 4151 |

According to the above metal composition, the metal leaching yield (expressed in % of metal basis analysed by ICP-OES) is:

| Al(%) | Co(%) | Cu(%) | Fe(%) | Ni(%) | Zn(%) | Mo(%) |
|---|---|---|---|---|---|---|
| 10.2 | 80.7 | 0.3 | 28.4 | 53.4 | 34.3 | 22.6 |

And the selectivity of leaching of Co vs the other main contained metals (Al and Mo) is:

| Al(%) | Mo(%) |
|---|---|
| 87 | 72 |

The precipitation step can be performed following the same process disclosed in previous examples for batteries. If needed, the precipitation step can include reusing steps in order to increase the Cobalt lactate content in the leachate, promoting higher precipitation rates.

CITATION LIST

W. Gao et al., "Lithium Carbonate Recovery from Cathode Scrap of Spent Lithium-Ion Battery: A Closed-Loop Process," Environ. Sci. Technol., 2017, vol. 51, no. 3, pp. 1662-1669.

The invention claimed is:

1. A process for recovering one or more metal ions selected from the group consisting of Cobalt, Nickel, Manganese and a mixture thereof from a metal-containing residue comprising:
   A) leaching a residue with a leaching solution comprising lactic acid to obtain a leaching mixture formed by a filtrate 1 comprising a Cobalt lactate, a Nickel lactate, a Manganese lactate or a mixture thereof and a solid cake 1;
   B) separating the filtrate 1 from the leaching mixture obtained in step A);
   C) precipitating the Cobalt lactate, Nickel lactate, Manganese lactate or a mixture thereof from the filtrate 1 obtained in step B) to obtain a precipitating mixture formed by a filtrate 2 and a precipitate 1 comprising the Cobalt lactate, the Nickel lactate, the Manganese lactate or a mixture thereof; and
   D) separating the precipitate 1 comprising the Cobalt lactate, the Nickel lactate, the Manganese lactate or a mixture thereof from the precipitating mixture obtained in step C);
   or alternatively,
   A) leaching the residue with a leaching solution comprising lactic acid to obtain a leaching mixture formed by a filtrate 1 comprising the Cobalt lactate, the Nickel lactate, the Manganese lactate or a mixture thereof and a solid cake 1;
   E) precipitating the Cobalt lactate, the Nickel lactate, the Manganese lactate or a mixture thereof from the filtrate 1 obtained in step A) to obtain a precipitating mixture formed by a filtrate 3 and a solid cake 2 comprising the Cobalt lactate, the Nickel lactate, the Manganese lactate or a mixture thereof; and
   F) separating the solid cake 2 from the precipitating mixture obtained in step E); and
   G) separating the Cobalt lactate, the Nickel lactate, the Manganese lactate or a mixture thereof from the solid cake 2.

2. The process according to claim 1, wherein the residue is selected from the group consisting of spent battery, metal alloy and metal catalyst.

3. The process according to claim 1, wherein the residue is selected from a residue comprising Cobalt, a residue comprising Nickel, a residue comprising Manganese, a residue comprising Cobalt and Nickel, a residue comprising Cobalt and Manganese, a residue comprising Nickel and Manganese and a residue comprising Cobalt, Nickel and Manganese.

4. The process according to claim 1, wherein:
   the filtrate 2 obtained in step D) is used in step A) as a leaching solution; or alternatively,
   the filtrate 3 obtained in step F) is used in step A) as a leaching solution.

5. The process according to claim 1, wherein the process further comprises an additional step of submitting the filtrate 2 obtained in step D), the filtrate 3 obtained in step F), a mixture of filtrates 2 obtained in step D), an mixture of filtrate 3 obtained in step F) or a mixture thereof under such conditions to recover one or more metal ion selected from the group consisting of Lithium ion, copper ion, aluminum ion and a mixture thereof.

6. The process according to claim 1, wherein the residue is in form of black mass.

7. The process according to claim 1, wherein the leaching solution further comprises one or more organic acids, one or more reducing agents, one or more proton acceptors, one or more solvents and a mixture thereof.

8. The process according to claim 1, wherein the leaching solution comprises from 10 to 40% by weight of lactic acid in relation to the total weight of the leaching solution.

9. The process according to claim 1, wherein the leaching solution:
   consists of lactic acid and water; or alternatively
   comprises lactic acid, choline chloride, citric acid and water.

10. The process according to claim 9, wherein the leaching solution comprises:
    from 10 to 40% by weight of lactic acid in relation to the total weight of the leaching solution;
    from 5 to 30% of choline chloride in relation to the total weight of the leaching solution;
    from 2 to 11% by weight of citric acid in relation to the total weight of the leaching solution; and
    enough quantity of water up to 100% by weight.

11. The process according to claim 1, wherein each one of the steps A, C and E is performed at a temperature from 20° C. to 100° C.

12. The process according to claim 1, wherein the weight relation between the residue and the leaching solution in step A is from 1:5 to 1:70.

13. The process according to claim 1, wherein:
    each one of the separating steps B), D) and F) is performed by filtration; and
    the separating step G) is performed by mixing the solid cake 2 obtained in step F) with a solvent selected from water and a mixture of water with one or more miscible organic solvents.

14. The process according to claim 1, wherein:
    the recovery yield of Cobalt ion from the residue is equal to or higher than 50% by weight;
    the recovery yield of Nickel ion from the residue is equal to or higher than 48% by weight; and
    the recovery yield of Manganese ion from the residue is equal to or higher than 32% by weight.

15. The process according to claim 1, wherein:
    the extraction yield of Cobalt ion is higher than 80% by weight;
    the extraction yield of Nickel is higher than 73% by weight; and
    the extraction yield of Manganese is higher than 87% by weight.

16. The process according to claim 1, wherein the process further comprises an additional step of adding to the resulting leaching mixture obtained in step A) one or more additives selected from the group consisting of reducing agents and oxidizing agents.

* * * * *